United States Patent
King et al.

(10) Patent No.: US 7,359,679 B2
(45) Date of Patent: Apr. 15, 2008

(54) MULTI-ACCESS SYSTEM AND METHOD USING MULTI-SECTORED ANTENNA

(75) Inventors: Wayne G. King, Stirling (AU); Craig Steven Ranta, Redmond, WA (US); Edward C. Giaimo, III, Bellevue, WA (US); James Brennan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 11/045,687

(22) Filed: Jan. 28, 2005

(65) Prior Publication Data

US 2006/0172711 A1    Aug. 3, 2006

(51) Int. Cl.
*H04B 7/00* (2006.01)

(52) U.S. Cl. ............... 455/101; 455/526.1; 455/277.1

(58) Field of Classification Search ............... None
See application file for complete search history.

(56) References Cited

U.S. PATENT DOCUMENTS

| | | | |
|---|---|---|---|
| 4,298,873 A | 11/1981 | Roberts | |
| 4,521,781 A | 6/1985 | Campi et al. | |
| 5,303,240 A | 4/1994 | Borras et al. | |
| 6,281,838 B1 | 8/2001 | Hong | |
| 6,292,134 B1 | 9/2001 | Bondyopadhyay | |
| 6,339,712 B1 | 1/2002 | Toivola | |
| 6,349,218 B1 | 2/2002 | Nakagawa et al. | |
| 6,522,897 B1 | 2/2003 | Martek et al. | |
| 6,661,378 B2 | 12/2003 | Bloy | |
| 6,741,207 B1 | 5/2004 | Allison et al. | |
| 6,757,553 B1 | 6/2004 | English | |
| 7,068,220 B2 | 6/2006 | DeNatale et al. | |
| 7,170,873 B1* | 1/2007 | Cisar et al. ............. | 370/334 |
| 2002/0132643 A1 | 9/2002 | Chang et al. | |
| 2003/0214453 A1 | 11/2003 | Downs | |
| 2004/0114535 A1 | 6/2004 | Hoffmann et al. | |
| 2005/0014533 A1* | 1/2005 | Cave et al. ............. | 455/562.1 |
| 2005/0206564 A1 | 9/2005 | Mao et al. | |
| 2005/0242993 A1 | 11/2005 | Hein | |
| 2006/0040709 A1* | 2/2006 | Adachi et al. ........... | 455/562.1 |
| 2006/0071794 A1 | 4/2006 | Sayers et al. | |
| 2006/0073850 A1 | 4/2006 | Cha et al. | |
| 2006/0139833 A1 | 6/2006 | Ranta et al. | |

OTHER PUBLICATIONS

Application Note AP-122: Microstrip Transmission Line Structures, Polar Instrument Ltd., http://www.polarinstruments.com/support/cits/AP122.html.

(Continued)

*Primary Examiner*—Thanh Cong Le
(74) *Attorney, Agent, or Firm*—Workman Nydegger

(57) ABSTRACT

A wireless access point is equipped with both an omnidirectional antenna and a directable antenna that can be selectively directed to any of a plurality of directional spaces overlapping the network space served by the omnidirectional antenna. The directable antenna is directed to an optimal directional space for a client when the access point is communicating with the client at a high data rate. The access point can intermittently exchange information with other clients using the omnidirectional antenna. The omnidirectional antenna enables broadcast signals to be transmitted to any client in the entire network space, but at a lower data rate. A preferred data rate and an optimal client directional space are re-determined periodically or as necessary based on parameters such as the data rate, signal strength, and rate of success in communicating data.

20 Claims, 14 Drawing Sheets

OTHER PUBLICATIONS

Sierra Wireless and Sprint PCS Deliver New Wireless Internet Solution, http://www.sierrawireless.com/news_events/news.aspx?year=2000&contentid=6A91F6A5-7193-4923-80B7-0EC323E7A60C, Aug. 23, 2000.

J. De Los Santos "Introduction to Microelectromechanical (MEM) Microwave Systems", Artech House, pp. 167-168 and 193, 1999.

* cited by examiner

MULTI-ACCESS SYSTEM AND METHOD USING MULTI-SECTORED ANTENNA

FIELD OF THE INVENTION

The present invention generally pertains to the use of a multi-sector antenna in a wireless computer network, and more specifically, to a method and system for improving communication efficiency in a wireless computer network by selecting a direction for transmitting and receiving signals with such an antenna so as to improve the signal strength and/or signal to noise ratio of wireless signals.

BACKGROUND OF THE INVENTION

The demand for computers to be able to communicate with each other and share resources continues to increase. Wireless networking fulfills this demand without the time, cost, and inconvenience of running network cables. Furthermore, as is well understood, wireless networking affords much greater flexibility to computer users by enabling them to access a network without being tethered to a network connection.

While wireless computer networking has grown in popularity, at the same time, applications that require increasingly more network bandwidth also are becoming more popular. For example, Internet users increasingly access the Internet to download music, watch streaming video, and converse with other people using voice over Internet protocol (VoIP). In particular, conveying streaming video over a wireless network link can easily overburden the wireless connection by exceeding its throughput capability.

Most conventional wireless network access points employ a single transceiver equipped with one or more omnidirectional antennae. As shown in FIG. 1A, access point 100 includes two omnidirectional antennae 102a and 102b coupled via a diversity switch 104 to an access point controller 106. Many commercially available chipsets reference designs well-suited for access points incorporate a diversity switch. Access point controller 106 is connected via a communications line 108 to a network 110 and manages uplink data transmissions from wireless communication clients (not shown) received via antennae 102a and 102b, as well as downlink data conveyed over communication line 108 for transmission via antennae 102a and 102b. More specifically, access point 100 may be coupled to a broadband Internet or other WAN interface (not shown). Although diversity switch 104 is shown as a separate component, it is typically integrated within access point controller 106, and antennae 102a and 102b are selectively coupled to the access point controller through the diversity switch.

Access point controller 106 also controls diversity switch 104 to optimize communications between access point 100 and one or more clients (not shown). Because of the high frequency employed in wireless communications, e.g., 2.4 GHz or 5 GHz in wireless networks meeting the Institute of Electrical and Electronics Engineers (IEEE) 802.11 specifications, the wavelength of the wireless signals used for communication by access point 100 is on the order of a few centimeters. As a result, a shift in position of an access point antenna of only a few centimeters can significantly change the quality of signals received and transmitted between access point 100 and its clients. Thus, switching between antennae—even antennae incorporated in or attached to a relatively compact device—can appreciably affect communication between an access point and a client.

As is understood in the art, the best communication quality between an access point and a client will not always be provided by using the closer of the two antennae to the client for transmitting and receiving the signal. Signals from the nearer antenna might be blocked by one or more obstacles—even moving obstacles such as people, pets, or doors that are opening or closing—while the signal path for the other antenna fortuitously may be less affected or provide a stronger signal due to reflections of the signal from surfaces. The antenna that provides the best communication quality may change from time to time. Thus the communication quality available using each antenna may be evaluated periodically, or when packet retry rates or other variables indicate that communication quality with the antenna currently in use has deteriorated.

Similarly, many wireless communication protocols support a range of communication rates. As the communication rate is increased, the effective range of data communication may be reduced. Thus, communications between an access point and a nearby client may occur at a higher rate than between the access point and a client that is further away, or a client in a position where more obstacles interfere with the signal between the access point and the client. In particular, the IEEE 802.11b wireless communication protocol supports four different communication rates that may be selected for communication between the access point and the client. The newer IEEE 802.11g protocol includes twelve different rates that may be used. Currently available access points adjust the data rate depending on factors such as received signal strength indication (RSSI) or the number of packet transmit retries required, by cycling through the available rates in a trial and error approach, or using other methods to select the appropriate rate.

For example, FIG. 1B shows a wireless local area network (LAN) 111b in which access point 100 communicates with clients 112a and 112b within a communication area represented by a dash line 114b. In this simplified example, where there are no intervening obstructions or sources of interference, because access point 100 is closer to client 112a, access point 100 and client 112a are able to communicate with each other at a higher communication rate represented by a heavy dash line 116a, than with client 112b, which is barely within the communication area, wherein the lower communication rate with client 112b is represented by a dotted line 116b.

Although an access point is able to reliably communicate with a more distant or a less optimally situated distant client by switching to a lower communication rate, data communication at the lower data rate may be unsatisfactory for the intended application. Furthermore, communication of a fixed amount of data at a low rate consumes more channel time, resulting in less time to communicate with other clients on the network.

To solve this problem, access points have been created that include multiple radio transceivers, each of which is coupled to a different directable antenna. However, using directable antennae that are directed toward (or in the optimum direction for) specific client locations sacrifices the coverage area available with an omnidirectional antenna in order to improve communication gain within the more narrow coverage areas served by the directable antennae. As a result, a client that may not have been able to workably communicate with an access point at a higher communication rate using an omnidirectional antenna at the access point, would be able to communicate with the access point at the higher communication rate using a directable antenna this is directed toward the client (or in the optimum direction for that client).

Multiple-radio transceiver access points with directable antennae unfortunately present a number of disadvantages. First, equipping the access point with multiple transceivers and the logic needed to control those transceivers understandably makes the access point much more costly to manufacture. As a result, multiple-radio transceiver access points may be too costly for in-home wireless networks or even for small business wireless networks.

Second, for reasons previously described with regard to signals being obstructed by or reflected by objects in the communication area, setting up the access point to properly direct the directable antennae may be difficult. Similarly, because obstacles move, or the client computers may be moved, and due to other factors, it may be inconvenient or impractical to adjust the directing of the antennae to a fixed orientation.

Third, although facilitating faster communication with some clients, using directable antennae may result in a limited coverage area that does not allow some clients to communicate with the access point. For example, as shown in FIG. 1C, an access point $100c$ includes a directable antenna (not shown) that covers a communication area 120. The directable antenna enables access point $100c$ to communicate at a higher communication rate (represented by a heavy dash line $116c$) with client $112b$, which is in communication area 120 than was previously possible using only an omnidirectional antenna. The omnidirectional antenna only enabled communication at a substantially lower rate, as represented by dotted line $116b$. However, client $112a$, which had been able to communicate with access point 100 (FIG. 1B) at a relatively high communication rate, is now outside communication range 120 of access point $100c$. Even if another transceiver with another directable antenna were added to access point $100c$ to facilitate communication with client $112a$, there still may be clients without service. For example, even if access point $100c$ were able to communicate with both clients $112a$ and $112c$, a client $112c$ that is well within the potential communication range of an omnidirectional antenna represented by a dotted line $114c$ would be unable to communicate with access point $100c$, unless yet another directable antenna and another transceiver were added to the access point to service client $112c$.

Fourth, using directable antennae with a multiple-radio transceiver access point can create overhead problems that may undermine the benefit of the multiple-radio transceiver access point. For instance, in the example of access point $100c$ (in FIG. 1C) having multiple directable antennae to communicate with clients $112a$ and $112b$, access point $100c$ will be able to suitably direct messages that are directed specifically to each of the clients. However, if there are broadcast messages for all stations, those messages will have to be transmitted multiple times, and sent on each of the transceivers/directional antennae to reach all the clients in the network.

Fifth, providing directable antennae trained on each of a number of clients may be a waste of resources. For example, if client $112b$ (FIG. 1C) is running a streaming video application, the improved data communication rate represented by heavy dashed line $116c$ would be desirable. On the other hand, if client $112b$ is casually accessing Internet web pages or sending e-mail, the higher data communication rate facilitated by the directable antenna would be unnecessary and could be viewed as a waste of hardware resources and processing overhead.

It would therefore be desirable to provide a system and method that would enhance communication between an access points and its clients in a wireless network. In particular, it would be desirable to improve the data rates available to a plurality of clients without having to include multiple-radio transceivers in the access point. Furthermore, it would be desirable to achieve higher data rates without having to waste bandwidth as a result of resending access point beacons or network messages, across a plurality of antennae that is each coupled to a different transceiver.

SUMMARY OF THE INVENTION

One of the advantages of the present invention is that it provides for a wireless network supporting high-bandwidth client applications without the cost or complexity of dedicating a directable antenna and transceiver to one or more clients. Embodiments of the present invention include a directable (or multi-sector) antenna that can transmit/receive in a selected direction, to service particular clients, improving gain and facilitating communication at a faster communication rate. Thus, each of the users coupled in communication with an access point may be able to benefit from higher speed wireless access to a network when needed. As used herein and in the claims that follow, the term "directable antenna" shall be understood to include a multi-sector antenna or any other type of antenna that is able to selectively transmit in each of a plurality of different directions. Also, the term "directing" as used herein and in the claims that follow, in connection with such an antenna, shall be understood to mean that the antenna is being caused to transmit and/or receive communications in at least one of the plurality of different directions in which the antenna is selectively able to do so.

By including an omnidirectional antenna and a directable antenna, one client is able to maintain wireless communication with the access point at a high communication rate, and the access point can intermittently exchange information with other clients without incurring the delay or overhead of having to redirect the directable antenna to each of the other clients. In addition, the omnidirectional antenna enables access point beacons and other broadcast signals to be sent to the entire network space at one time, without having to transmit a broadcast-type signal in each different direction provided by the directable antenna.

In addition, embodiments of the present invention automatically identify a preferred direction in which to direct the antenna to achieve optimal gain between the access point and the clients. Moreover, embodiments of present invention are configured for the access point to communicate with a client when the directable antenna is directed to the client so that the client can immediately take advantage of the improved gain to transmit to the access point at a higher communication rate, instead of waiting until a communication rate checking algorithm verifies the signal strength or accumulated reduced retry rate or packet errors ordinarily relied upon before even gradually increasing the communication rate.

One aspect of the present invention is thus directed to a method for controlling communication between an access point and a client in a wireless network. An omnidirectional antenna is provided to facilitate coverage of a network space. A directable antenna also is provided to selectively provide coverage of each of a plurality of different directional spaces, each of the directional spaces overlapping a portion of the network space. A client directional space is identified from among the plurality of directional spaces, the client directional space generally facilitating a higher communication rate between the access point and the client, compared to a lower communication rate that may be available between the access point and the client using the omnidirectional antenna. Either the omnidirectional antenna or the directable antenna is selected for communicating with the client based on at least one of a characteristic of a transmission communicated between the access point and client and a characteristic of the wireless network. When the directable antenna is selected, the directable antenna is directed to the client directional space.

An optimal directional space is identified from among the plurality of directional spaces, where the optimal directional space facilitates a highest communication rate between the access point and the client among the plurality of directional spaces. The optimal client directional space is identified by directing the directable antenna to at least a subset of the plurality of directions, and comparing a signal strength of a plurality of communications received from the client and selecting as the client directional space a directional space for which the signal strength is the greatest, comparing a client signal strength measured by the client for at least one polling communication received from the access point while the directable antenna was directed to an identifiable directional space determinable from a label appended to the polling communication, or comparing a communication accuracy rate for a plurality of communications exchanged with the client and selecting as the client directional space a direction for which the communication accuracy is highest. Instead of signal strength, signal to noise ratio may be used as a measure to evaluate signal quality. The communication accuracy is determinable from a packet error rate, a number of acknowledgement failures, or the number of transmissions that are resent to successfully achieve communication. A plurality of polling signals may be transmitted from the access point to the client, where receipt of each of the polling signals causes the client to transmit a responsive communication for the access point to evaluate.

Upon directing the directable antenna to the client directional space, the communication rate between the client and the access point is caused to increase, by increasing a data downlink transmission rate when transmitting data from the access point to the client or by sending an increase transmission rate message signaling the client to increase the uplink transmission rate when transmitting to the access point.

An association table is maintained at the access point. The association table includes an entry for the client indicating a preferred omnidirectional communication rate available when the omnidirectional antenna is selected and/or a preferred directional communication rate available when the directable antenna is selected and directed to the client directional space.

A characteristic of a transmission communicated between the access point and the client to determine whether the directable antenna is directed to the client includes a volume of data in the transmission or a priority associated with the transmission. A characteristic of the wireless network to determine whether the directable antenna is directed to a client includes one of a number of characteristics. The characteristic may include a rate at which data communications are exchanged between the access point and the client or a likelihood of a large volume of data to be exchanged with the at least one network client based on a record of past communications exchanged with the client. Alternatively, the characteristic may include a reduced demand among other network clients to communicate with the access point or a reduced demand among other network clients to exchange large volumes of data with the access point. The characteristic also may include a client priority assigned to the client.

In addition, transmissions intended for all clients within the communication space are broadcast using the omnidirectional antenna. The omnidirectional antenna also is used to prevent a hidden client not in direct communication range with a known client from transmitting while the access point is communicating with the known client. Before transmitting to the known client, the access point transmits on the omnidirectional antenna at least one protection mechanism frame. Alternatively, upon receiving a request to send frame (RTS) from the known client, the access point transmits on the omnidirectional antenna the clear to send (CTS) frame to the known client.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
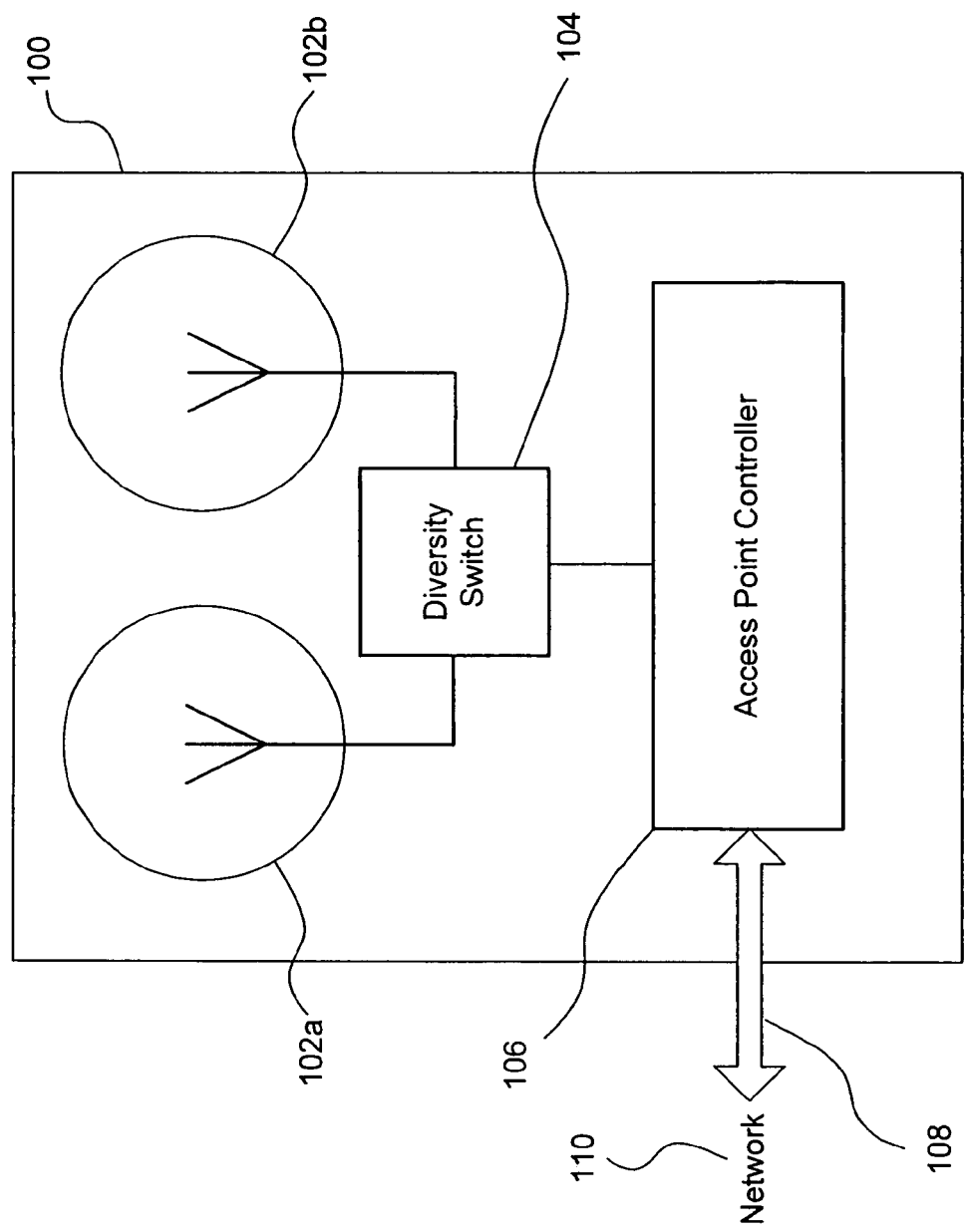
FIG. 1A (Prior Art) is a functional block diagram of a conventional wireless networking access point.
Figure 1B:
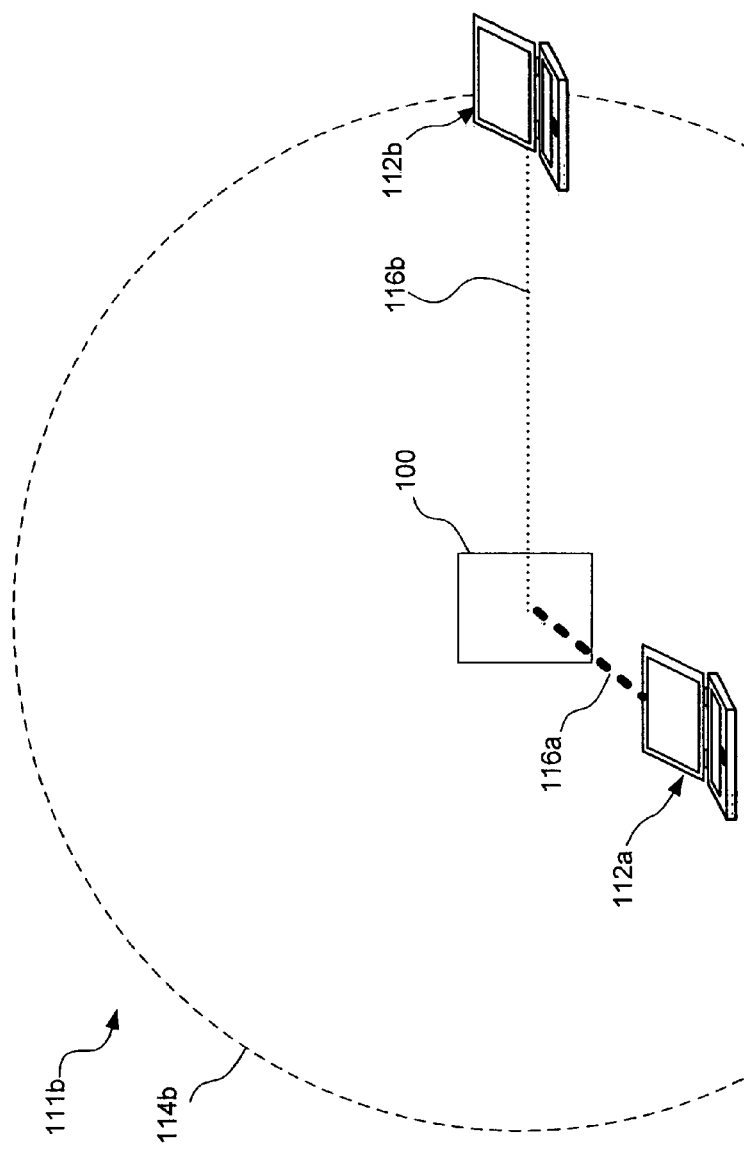
FIG. 1B (Prior Art) is a functional view of client computers communicating with a conventional access point.
Figure 1C:
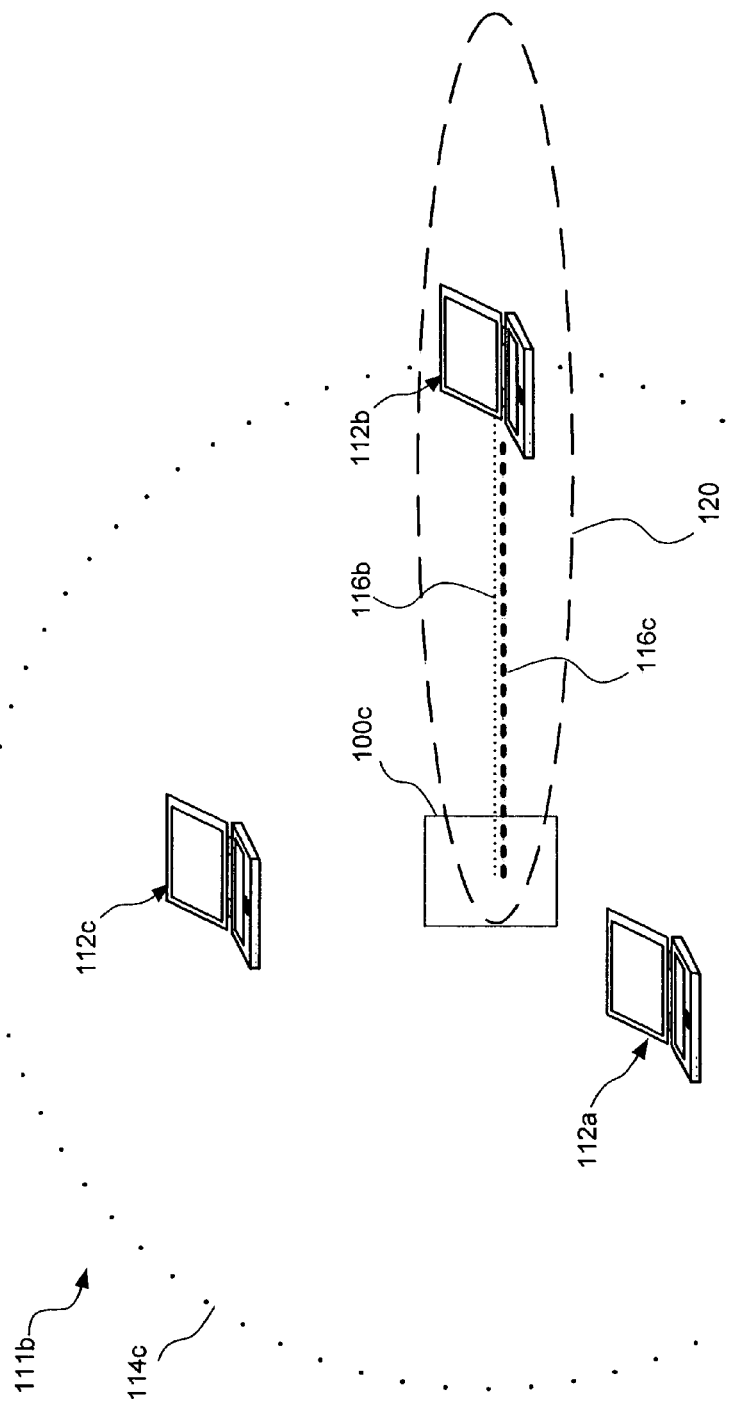
FIG. 1C (Prior Art) is a functional view of a wireless access point equipped with a directable antenna directed to service a particular client.
Figure 2:
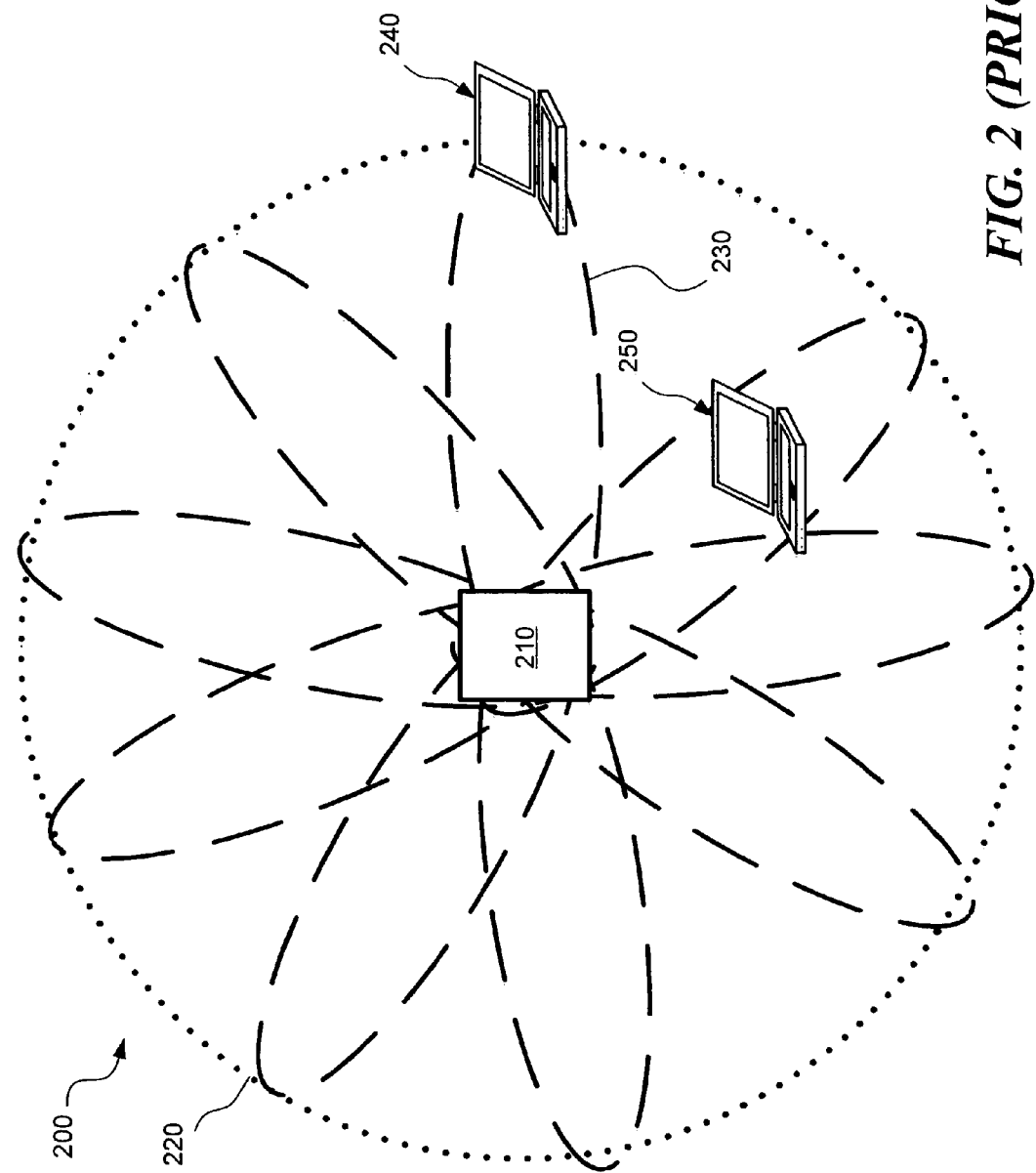
FIG. 2 is a functional view of a network employing an access point including an omnidirectional antenna and a directable antenna according to an embodiment of the present invention.

General Operation of an Access Point According to an Embodiment of the Invention FIG. 2 illustrates a functional view of the operation of an access point according to an embodiment of the present invention. Wireless network 200 includes an access point 210 having both omnidirectional and directable antennae. A network space defined by the communication range of the omnidirectional antenna is represented by a dotted line 220. A plurality of directional communication spaces of the directable antenna are represented by dash lines 230. The directional communication spaces at least partially overlap the network space defined by dotted line 220.

The directable antenna is directable among the plurality of directional ranges defined by dash lines 230. Thus, in contrast to some previously available access points having multiple radio transceivers each coupled with a directable antenna covering a particular communication range, the directable antenna used in this embodiment of the present invention is able to communicate over a plurality of directional spaces around access point 210. A directable antenna system suitable for use with such an access point is described in commonly assigned, co-pending patent applications, Ser. No. 11/027,748, entitled "ELECTRONICALLY DIRECTABLE SECTOR ANTENNA," which was filed on Dec. 30, 2004, and 11/045,533, entitled "CONTROL OF A MULTI-SECTORED ANTENNA SYSTEM TO IMPROVE CHANNEL EFFICIENCY.". Although FIG. 2 shows the network space defined by dotted line 220 and the directional spaces defined by dash lines 230 as two dimensional, it will be understood that spaces 220 and 230 could be three-dimensional, so that the directable antenna suitably might be directable in altitude as well as azimuth.

As described above, one benefit of employing a directable antenna is the increase in gain possible in the area covered by the directable antenna when directed to transmit and/or receive in the direction covering the area. As a result, it is possible for a client and an access point to communicate over a greater distance at a relatively faster rate than would be possible if the access point included only an omnidirectional antenna. Alternatively, the improved gain made possible by using a directable antenna also can be used to achieve faster communication rates over a shorter distance than would be possible with an access point having only an omnidirectional antenna. Embodiments of the present invention, therefore, will typically take advantage of the directable antenna to increase communication rates between clients and the access point. This has the added advantage of reducing the on-air-time consumed by communications between the access point and each of the clients, thereby allowing more bandwidth to other clients in the system.

However, an access point according to an embodiment of the present invention also employs an omnidirectional antenna. As a result, access point 210 provides both flexibility and efficiency in servicing wireless network 200. More specifically, with the greater communication rate available using a directable antenna, access point 210, for example, can service client 240 at a high communication rate to support applications requiring high throughput, such as streaming video. At the same time, unlike conventional access points using one or more directable antennae, clients at locations not served by a directable antenna also can communicate with access point 210, albeit likely at a lower communication rate. Furthermore, using an embodiment of the present invention incorporating a directable antenna, for applications not involving or requiring high throughput, access point 210 can serve a client via the omnidirectional antenna without incurring the overhead of redirecting the directable antenna. The availability of the omnidirectional antenna thus avoids the delay involved in activating the directable antenna to operate in a different direction service a second client, then redirecting the antenna back yet again toward the first client, when the second client's communication requirements, which may be minimal, have been satisfied.

Access Point Incorporating Directional and Omnidirectional Antennae

Figure 3:
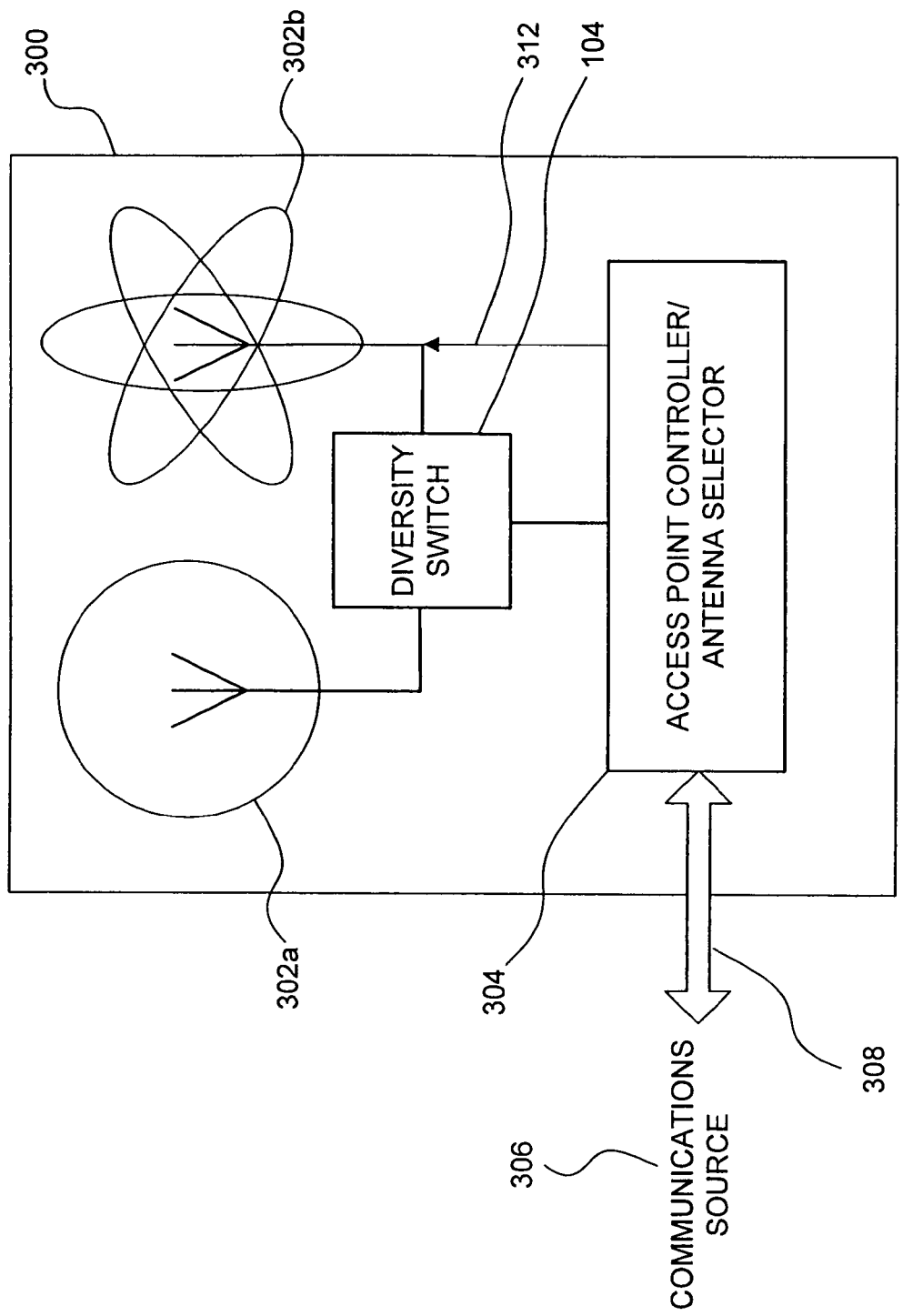
FIG. 3 is a high level functional block diagram of a representative wireless networking access point including an omnidirectional antenna and a directable antenna employed in an embodiment of the present invention.

FIG. 3 illustrates an access point 300 according to an embodiment of the present invention including both an omnidirectional antenna 302a and a directable antenna 302b. Access point 300 also includes an access point controller/antenna selector 304, whose operation is discussed in more detail below. Access point controller 304 is coupled with a communication source 306, such as a wide area network (WAN), for example, the Internet, over a communication line 308. Thus, access point 300 is able to provide access to communication source 306 wirelessly to clients associated with access point 300.

More specifically, access point controller 304 is coupled to both omnidirectional antenna 302a and directable antenna 302b via a diversity switch 310. As described above, most conventional, access points include a diversity switch allowing an access point controller to select between two omnidirectional antennae included in and/or on the access point. Also, as described above, switching between even closely situated antennae enables the access point controller to take advantage of diversity to overcome obstructions and interference, and/or to enable access point 300 to take advantage of favorable signal reflections for one of the two antennae. By contrast, using embodiments of the present invention, access point controller 304 selectively uses diversity switch 310 to select between omnidirectional antenna 302a and directable antenna 302b, depending upon which antenna is desirable for the current communication, as is described further below. Access point controller 304 also is directly coupled with directable antenna 302b to enable access point controller 304 to selectively direct directable antenna 302b, i.e., to control the direction in which it is transmitting and/or receiving a wireless signal. Thus, access point controller 304 is able to steer directable antenna 302b to a direction providing improved line-of-sight or reflected signal strength.

Figure 4:
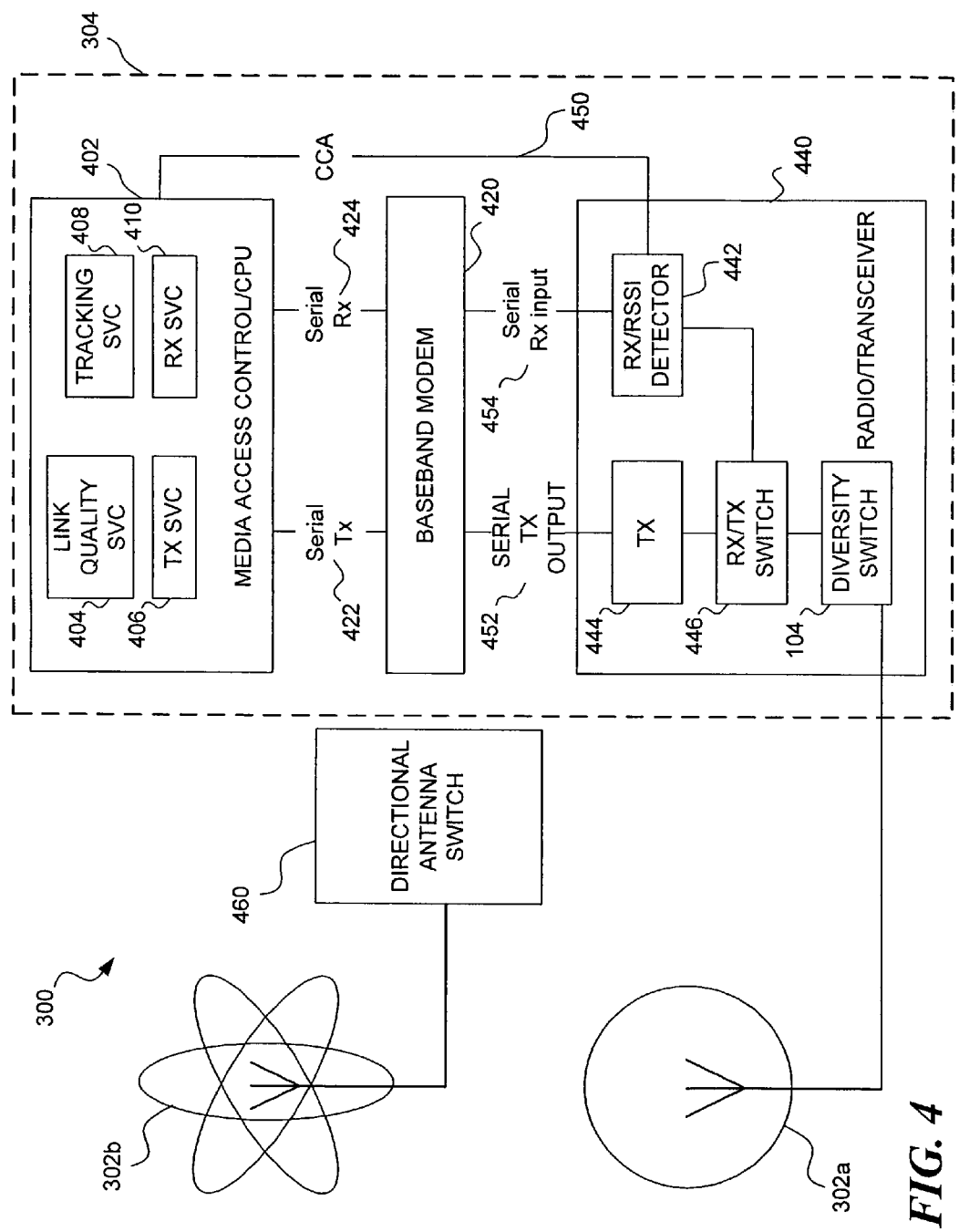
FIG. 4 is a more detailed functional block diagram of the representative wireless access point of FIG. 3.

FIG. 4 illustrates a more detailed functional block diagram of access point 300 to better illustrate operation of embodiments of the present invention. In particular, FIG. 4 shows the functional components of access point controller 304, as well as showing a directable antenna switch 460 that is used to direct directable antenna 302b.

Access point controller 304 principally includes three subsystems, including a media access control/CPU subsystem 402, a baseband modem 420, and a radio/transceiver 440. Baseband modem 420 performs standardized assembly and disassembly of data packets. Baseband modem 420 receives a serial transmission line 422 from a media access control/CPU subsystem 402, and provides a serial reception line 424 to media access control/CPU 402. Baseband modem 420 also provides a serial transmission output line 452 to radio/transceiver 440, and receives a serial reception input line 454 from radio transceiver 440.

Radio/transceiver 440 comprises four principal components, including a receiver/RSSI detector or 442, a transmitter 444, a receive/transmit switch 446, and diversity switch 104. Radio/transceiver 440 includes the standard radio/transceiver subsystem used in conventional access points. As described above, diversity switch 104 is used to select between omnidirectional antenna 302a and directable antenna 302b instead of selecting between two omnidirectional antennae. In one embodiment of the present invention, media access control/CPU subsystem 402 is used in concert with directable antenna switch 460 to provide the advantages of the present invention.

Tracking Service

Client tracking service 408 performs location determination, and client tracking. Location determination, which is described further below in connection with FIG. 6, determines an optimal direction in which to direct directable antenna 302b for a newly associated client by transmitting probe signals using transmitter 444 and evaluating the strength of responsive signals received by receiver/RSSI detector 442.

It will be appreciated that embodiments of the present invention may evaluate the quality of signals by measuring RSSI, signal to noise ratio, or by employing other suitable measurements. Accordingly, descriptions involving use of RSSI measurements, for example, are illustrative of how signals may be measured according to embodiments of the present invention, but do not limit how signals are measured according to embodiments of the present invention.

A client tracking service, which also is described in more detail below, reevaluates whether the optimal direction for a particular client has changed as the result of the client moving or because of changes in the surrounding conditions that affect the direction that is optimal for that client. Client tracking service reevaluates the optimal direction by re-probing the network, for example, when client communication degrades or after passage of a prescribed period of time, which is also described further below.

Link Quality Service

Link quality service 404 suppresses interfering transmissions from other stations when the directable antenna is in use, and performs rate selection/optimization. In suppressing potentially interfering transmissions, it should be noted that if access point 300 is communicating with a first client via directable antenna 302b, directable antenna 302b may be directed such that a second client may not detect communication between access point 300 and the first client. Accordingly, the second client may initiate communication, thereby interfering with the communication between access point 300 and the first client. To prevent this interference, link quality service 404 uses 802.11 protection mechanisms, such as protection mechanism frames including request to send (RTS) frames and clear to send (CTS) frames, over the omnidirectional antenna 302a at a communication rate sufficiently slow to permit reception across the entire communication area served by access point 300. For example, before transmitting to a client using the directional antenna, access point 300 may transmit a self-directed CTS frame over the omnidirectional antenna to alert all clients within transmission range of access point 300, and not just those within range of the directional antenna as directed to the recipient, not to transmit. Analogously, upon receiving an RTS frame from a client, access point 300 will broadcast the CTS frame to the client using the omnidirectional antenna, again indicating to all clients within transmission range of access point 300 to refrain from transmitting. The protection mechanism frames cause the second client to refrain from transmitting for a specified period.

Also, link quality service 404 controls communication rate selection as a function of a number of retries, antenna direction, the RSSI, and/or a packet error rate. A number of algorithms may be used by link quality service 404 to determine an optimal communication rate based on the antenna selected, and on the historical communication quality provided for a given direction of directable antenna 302b.

Transmission Service

Transmission service 406 also performs two principal functions. First, the transmission service selects between antennae 302a and 302b and directs directable antenna 302b based on the desired direction determined by tracking service 408. Second, once the antenna selections are made, transmission service 406 engages receiver/RSSI detector 442 to perform clear channel assessment (CCA) to determine if the channel is clear to send, or whether other traffic might interfere with the pending transmission. According to an embodiment of the present invention, it is important to ensure that the desired antenna is selected (and, in the case of directable antenna 302b, directed to a desired direction) before the CCA determination is performed. Otherwise, for example, CCA may be performed with the directable antenna pointed in a particular direction to find that the channel is clear, only to have the antenna redirected to an intended direction where the channel is not clear. It is also possible for the CCA to be performed on the omni-antenna.

Reception Service

Reception service 410 monitors uplink traffic from clients to determine which of antennae 302a and 302b should be the default antenna. Statistics are kept, such as packet rate, throughput, and other parameters that may affect the antenna selection process. For example, clients generating high volumes of uplink traffic may be identified as warranting use of directable antenna 302b, because the volume of traffic justifies the overhead incurred in directing directable antenna 302b to the client. On the other hand, if a client generates little uplink traffic, omnidirectional antenna 302a may be used to receive traffic from that client, which typically will not require a high throughput. Even though omnidirectional antenna 302a may be capable of receiving data at a lower communication rate than would be possible using directable antenna 302b, for lower uplink traffic volumes, it may not be worth incurring the computational antenna directing overhead involved in using directable antenna 302b to receive in a different direction from that client.

In addition, reception service manages acknowledgment handling to ensure that acknowledgment frames match the packets being acknowledged. More specifically, when a packet is received with omnidirectional antenna 302a or with directable antenna 302b, the acknowledgement should be sent over that same antenna. If directable antenna 302b is used, directable antenna 302b should be directed in the same direction from which the data packet was received. As is also further described below, uplink traffic communication rate is optimized to allow for the fastest possible communication rate supported by the optimal antenna selection for the client.

In sum, using link quality service 404, transmission service 406, tracking service 408, and reception service 410, access point controller manages and optimizes access point 300 operations as further described below.

Access Point General Operation

Figure 5:
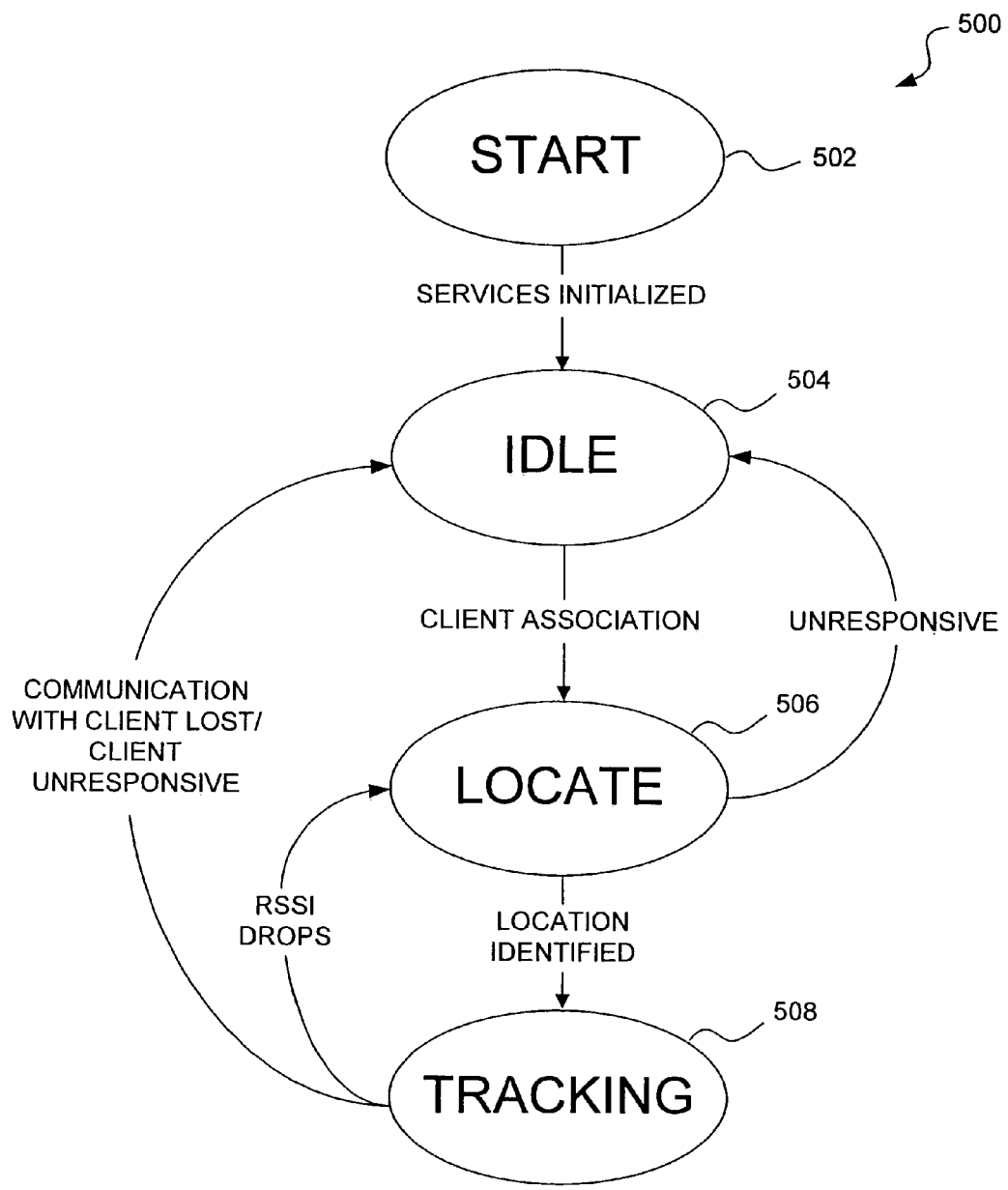
FIG. 5 is a state diagram showing the states used to locate and track clients.

FIG. 5 presents a state diagram 500 representing the general operational states of an access point for each client operating according to an embodiment of the present invention. State diagram 500 begins at start step 502. At start step 502, all media access control/CPU (FIG. 4) services are initialized. Once these services are initialized, at idle step 504, access point awaits communication from client stations. If, while at idle state 504, a client attempts to associate with the access point, the access point proceeds to locate state 506 to locate the client for purposes of identifying the appropriate antenna and, when possible, the appropriate directable antenna sector best suited for communication with that client. Once the location is identified, at tracking state 508, the identified location is stored for later use. The identified location is maintained as long as the access point continues to communication with the client. While in the idle state 504 or locate state 506, the omnidirectional antenna will be used to communicate with the client.

Subsequently, however, if the RSSI drops for the client, the access point reverts to locate state 506 to re-locate the client and to determine the appropriate antenna and antenna sector (direction) selection. If the client is unresponsive to attempts by the access point to locate the client, the access point reverts to idle state 504, the client is assumed to be disassociated from the access point. Therefore, the access point attempts to identify location of clients and to make appropriate antenna selections for each client. The access point monitors communications with the clients to track clients for possible movement or to detect the end of client communication. The access point then continues to track the clients. When no clients are associated with the access point, the access point rests idle at state 504 until a client attempts to associate with it.

Procedures for Locating and Tracking Clients

Figure 6A:
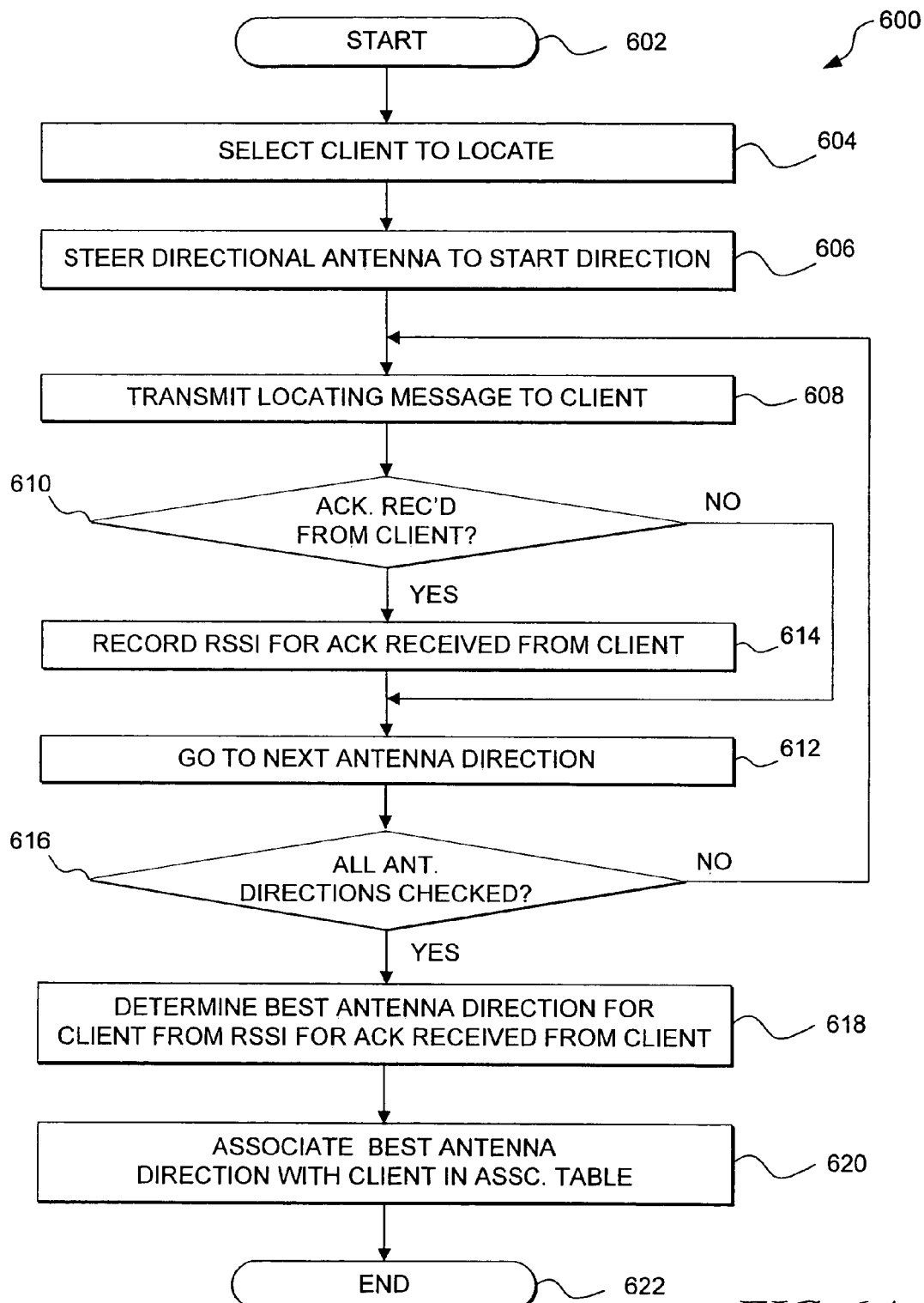
FIG. 6A is a flow diagram illustrating the logical steps used by an access point to locate client stations by transmitting a message to each associated client from each direction of a directable antenna and measuring the resulting acknowledgment.
Figure 6B:
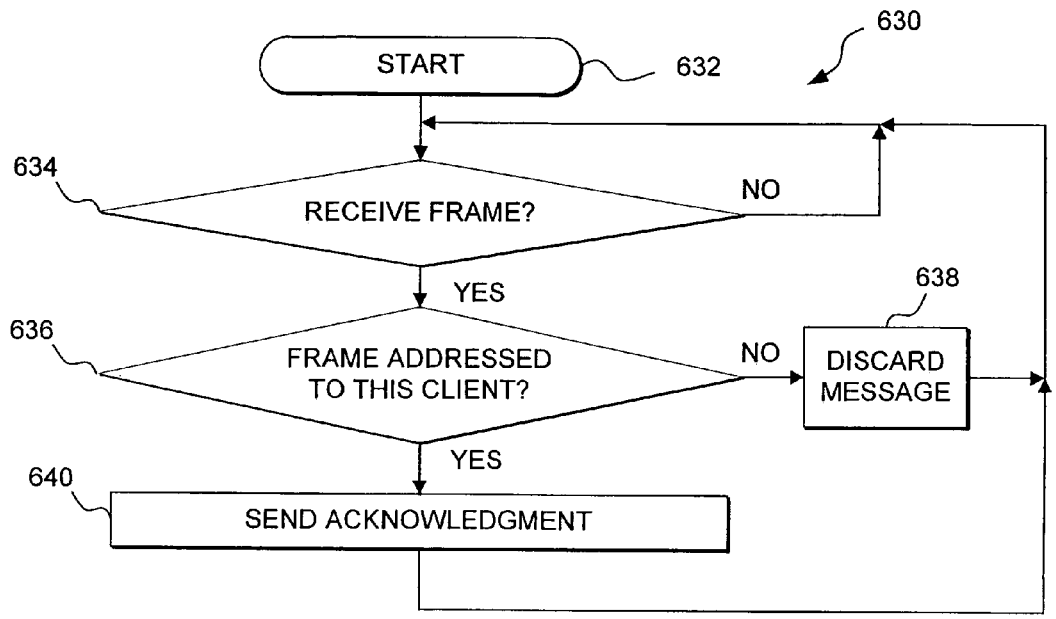
FIG. 6B is a flow diagram illustrating the logical steps used to by a client to respond to messages transmitted by an access point according to the logical steps illustrated in the flow diagram of FIG. 6A.
Figure 6C:
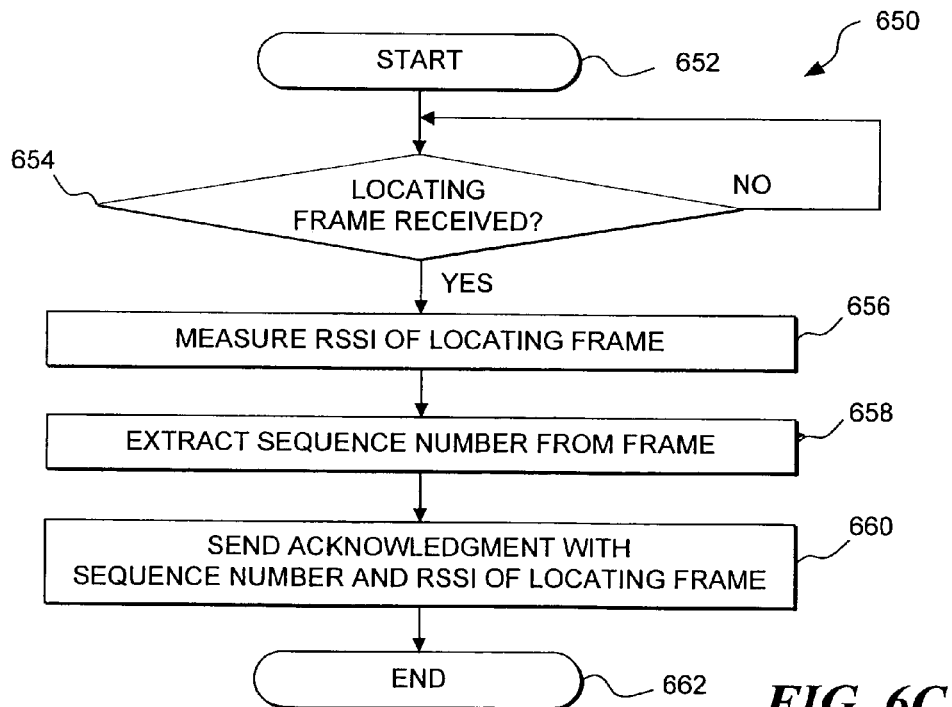
FIG. 6C is a flow diagram illustrating the logical steps used to by a client to evaluate and respond to access point locating messages in accordance with the logical steps illustrated in the flow diagram of FIG. 6D.

FIGS. 6A and 6C present flow diagrams 600 and 650, respectively, illustrating logical steps for locating and tracking clients to identify the sector (or direction) of directable antenna 302*b* (FIGS. 3 and 4) that is best suited for communicating with a particular client. As described above, an access point according to an embodiment of the present invention may not always use the directable antenna to communicate with a client, because the traffic with the client may not be sufficient in data rate or duration, to justify the overhead in directing directable antenna 302*b* toward the client. Notwithstanding, in the event that uplink from the client or downlink traffic to the client warrants the improvement in throughput available using directable antenna 302*b*, a preferred embodiment of the present invention tracks the direction of each client to be able to direct directable antenna 302*b* to a sector where the client is located. The logical steps illustrated in flow diagram 600 or 650 will be initiated when a client seeks to associate with the access point, when a packet is received by the access point that is sent from a client not represented in a table of tracked clients, when the access point has lost contact with a client, when a predetermined client packet error rate or packet retry rate has been exceeded, periodically to verify client location, or in other similar cases. FIGS. 6B and 6C present flow diagrams 630 and 650, respectively, illustrating logical steps used by clients in responding to messages received sent in an effort to locate the clients.

In embodiments of the present invention, tracking and location information about clients and other client information is stored by the access point controller in an association table. Conventional access points employ association tables to determine if messages received by a network are addressed to a client associated with the access point. Thus, for example, if a message is received by an access point that is addressed to a client that is not associated with the access point, the message may be discarded.

In connection with embodiments of the present invention, the association table maintains additional information for each client associated with the access point, such as the optimal direction to direct the directable antenna to service the client, the fastest reliable communication rate attainable with the client using the directable antenna directed in that direction, the fastest reliable communication rate attainable with the client using the omnidirectional antenna, and the last time the client information was tested or verified.

Flow diagram 600 of FIG. 6A illustrates the logical steps for locating and/or tracking a client in terms of identifying a desirable directable antenna direction for the client by using directed polling signals. Flow diagram 600 begins at a step 602. At step 602, a client to locate is selected. As previously described, the client sought may be a new client seeking to associate with the access point, a client with whom the access point has lost contact, a client for whom a predetermined client packet error rate or packet retry rate has been exceeded, or a client the access point seeks to locate for any other reason. At step 606, the directable antenna is directed to a starting direction for probing for the client location. It will be appreciated if the starting direction could be a direction to which a directable antenna happens to be currently steered or a predetermined available direction. At a step 608, a tracking message is transmitted to the client. The tracking message is a null message seeking an acknowledgement from the selected client.

At a decision step 610, it is determined if an acknowledgment has been received from the client. If not, after a suitable interval has passed waiting for such acknowledgments, at a step 612, the directable antenna is directed to the next antenna direction, and flow diagram 600 loops to step 608. On the other hand, if it is determined at decision step 610 that an acknowledgment has been received from the client, at step 614, the RSSI for the acknowledgement received from the client is recorded. At a decision step 616, it is determined whether all of the directable antenna directions have been evaluated. If not, at step 612, the directable antenna is directed to the next antenna direction, and flow diagram 600 loops to step 608. On the other hand, if it is determined at decision step 616 that all the antenna directions have been evaluated, at a step 618, the antenna direction for which the best RSSI was recorded is determined. At step 620, the best client direction determined at step 618 is stored in the association table with the client identifier such that in the association table. As a result, when a communication is to be initiated with a client that could benefit from the increased communication rate made available by directing the directable antenna to the client, the access point controller can access the association table to know to which direction to steer the directable antenna. Flow diagram 600 ends at a step 622. Thus, locating and/or tracking a client in terms of identifying a desirable directable antenna direction for the client by using directed polling signals.

It will be appreciated that the logical steps for evaluating a desirable or optimal directable antenna direction illustrated in flow diagram 600 (FIG. 6A) could be adapted in a number of ways. For example, it may be desirable to transmit messages to the client at each of the directable antenna directions a predefined number of times. The recorded RSSI for each position could then be averaged over the number of times that the messages were transmitted or otherwise combined to determine the antenna direction that may be best. Embodiments of the present invention can be adapted to employ any methodology desired to evaluate the effectiveness of each of the directable antenna directions.

Flow diagram 630 of FIG. 6B illustrates the logical steps followed by a client in responding to the locating messages transmitted as described in flow diagram 600 (FIG. 6A). As can be seen from flow diagram 630, a client responding to an access point operating according to the logical steps of flow diagram 600 (FIG. 6A) need not operate differently than a client responding to a conventional access point—the client receives messages and responds to them.

Flow diagram 630 begins at step 632. At decision step 634, it is determined if the client has received a frame. If not, flow diagram 630 loops of decision step 634, idling until a transmission is received. On the other hand, if at decision step 634 it is determined that a frame has been received, at decision step 636, it is determined if the frame received was addressed to this client. If not, at step 638 the messages discarded. On the other hand, if it is determined at decision step 636 that the received frame is addressed in this client, at step 640, an acknowledgment is sent. As previously described in connection with flow diagram 600 (FIG. 6A), the access point measures the RSSI for the acknowledgment or acknowledgments returned by the client to locate the client to identify a desirable antenna direction. Once the acknowledgment is sent, flow diagram 630 loops to decision step 634 to await receipt of a next transmission. Thus, conventional acknowledgments transmitted by a client are all that are needed of the client for an access point operating according to the logical steps illustrated in flow diagram 600 for the access point to identify a desirable antenna direction for a client.

Alternatively, as shown in flow diagram 650 of FIG. 6C, clients can be configured to assist the access point in locating clients collectively, without the access point sequencing through available antenna directions for each client. More specifically, the client can be configured to perform its own RSSI measurement of the broadcast locating messages sent by the access point. Thus, the access point need only transmit one polling message per direction regardless of the number of clients being tracked. Each client receiving the polling message then responds to the access with a report message that includes the RSSI of the polling message measured by the client.

Flow diagram 650 begins at step 652. At decision step 654, it is determined by the client whether a locating frame has been received. If not, flow diagram 650 loops to decision step 654, waiting until a locating frame is received. It is assumed for purposes of flow diagram 650 that messages other than locating frames are handled by other processes using logical steps not illustrated in flow diagram 650. On the other hand, if it is determined at decision step 654 the locating frame has been received, at step 656, the RSSI of the locating frame is measured. At step 658, a sequence number used by the access point to identify the locating frame to which the client is responding as explained in flow diagram 670 (FIG. 6D) is extracted from the frame. At step 660, the client transmits an acknowledgment that includes the sequence number extracted from the locating frame at step 658, as well as the RSS side of the locating frame measured at step 656. Once the acknowledgment is sent, flow diagram 650 loops to decision step 654 to await receipt of a next locating frame.

Figure 6D:
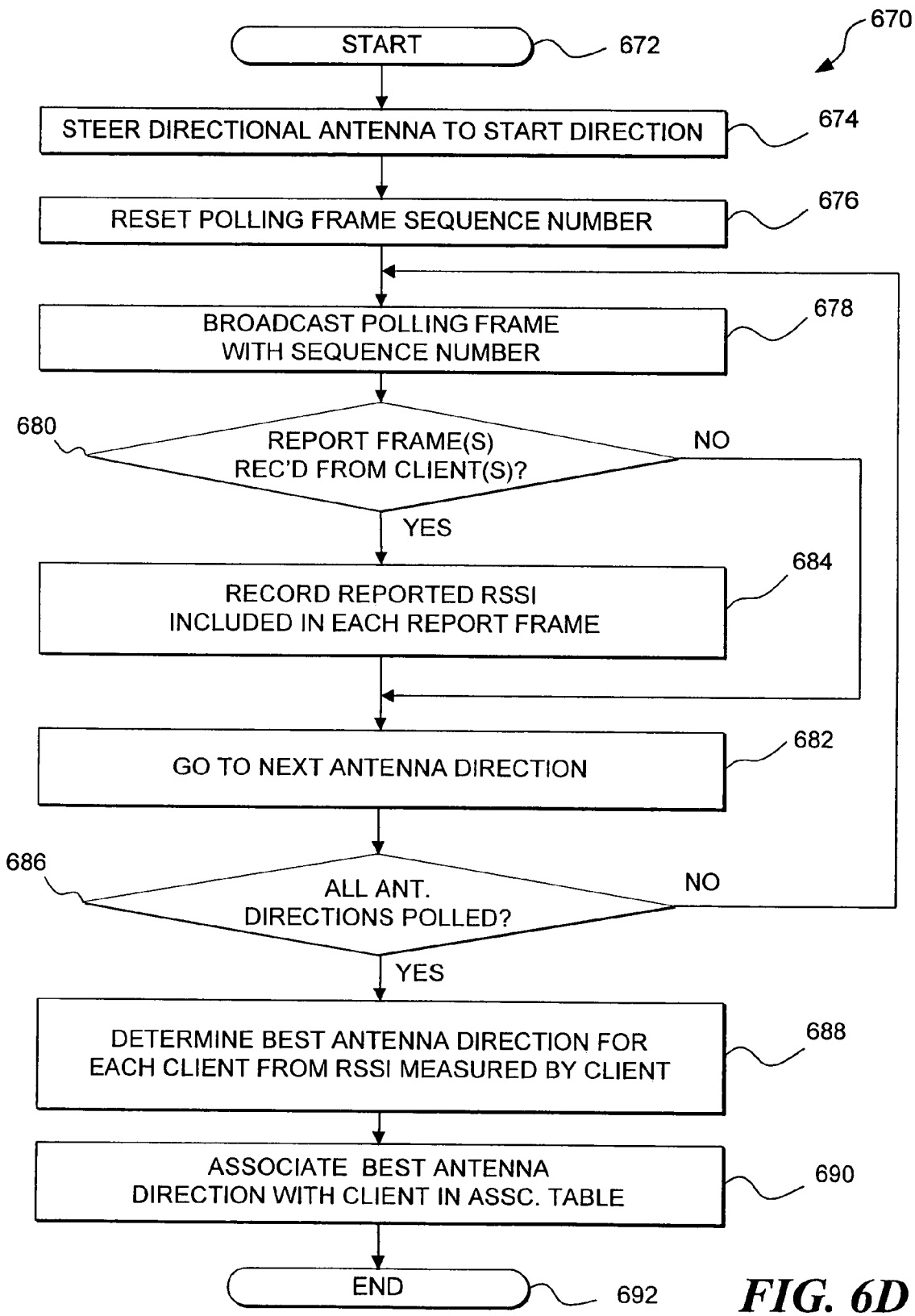
FIG. 6D is a flow diagram illustrating the logical steps used by an access point to locate client stations by broadcasting messages to each direction of a directable antenna, and evaluating RSSI measured and reported by clients.

Clients transmitting the sequence number of the locating frame and the measured RSSI of each locating frame as illustrated in FIG. 6C enables an access point to broadcast locating frames in each of the antenna directions rather than transmit locating frames to each client for each antenna direction, as illustrated in FIG. 6D. Flow diagram 670 begins at step 672. At step 674, a directable antenna is steered to a starting direction. It will be appreciated if the starting direction could be a direction to which a directable antenna is currently steered or a predetermined available direction. At step 676, a frame sequence number is reset to correspond either with the antenna position or s predetermined initial sequence number. At step 678, a polling frame including the sequence number is broadcast in the direction to which the directable antenna is currently steered. At decision step 680, is determined if a report frame has been received from one more clients. If not, after a suitable interval has passed waiting for such frames, flow diagram 670 proceeds to step 682 where the antenna is steered to a next antenna direction. On the other hand, if it is determined at decision step 680 that a report frame has been received from one or more clients, at step 684, the RSSI reported by the client is recorded, the at step 682 the antenna is steered to the next direction. At decision step 686, is determined if all the antenna directions have been polled. If not, flow diagram loops to step 678 to transmit polling frames at the current antenna direction.

On the other hand, if it is determined at decision step 686 that all the antenna directions have been polled, at step 688, the best antenna direction is determined for each client that acknowledged the polling frames frames. What is the best antenna direction may be determined according to the reported RSSI measured by the client and included in the report frame. The sequence number included in the acknowledgment frames allows the access point to identify to which direction the antenna was steered when the broadcast message that generated the acknowledgment was sent. At step 690, the best antenna direction determined for each client is associated with each client in the association table. Flow diagram 670 and at step 692.

It will be appreciated that embodiments of the present invention can benefit from broadcast polling in that the access point need not transmit to every client in every direction to poll each of the associated clients. It will also be appreciated that desirable antenna directions are determinable by combining logical steps of flow diagrams 6A and 6D, such that desirable signal directions are determinable by recording RSSI reported by clients for polling signals and by measuring the RSSI measured by the access point for the reporting frames received from the clients; the measurements can be averaged or otherwise combined to determine a preferred antenna direction for the client.

Access Point Transmission Sequence

Figure 7A:
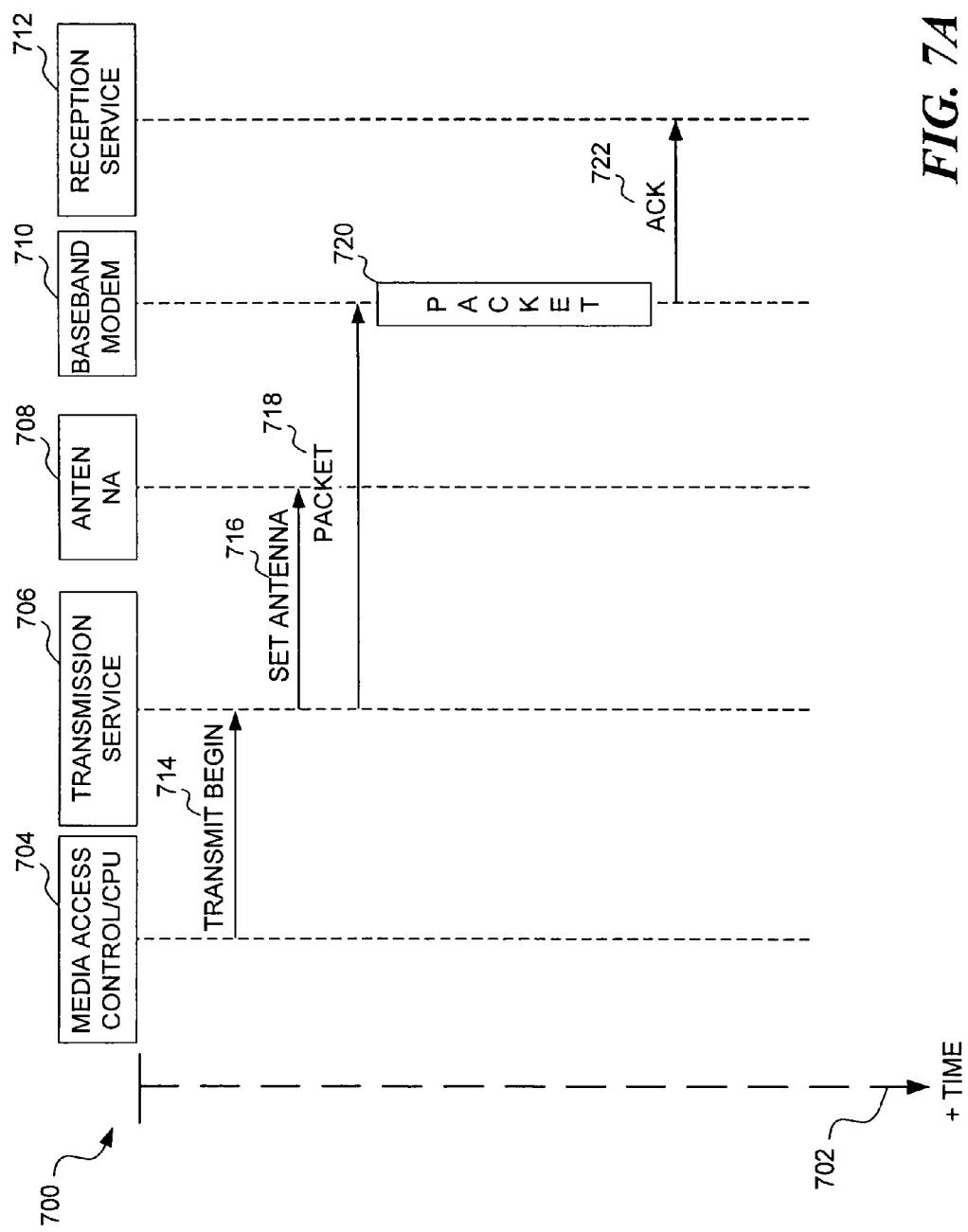
FIG. 7A is a message sequence chart illustrating a sequence of steps used by an access point to transmit messages.

FIG. 7A illustrates a message sequence chart 700 representing how an access point according to an embodiment of the present invention processes a transmission to a client. More particularly, message sequence chart 700 shows how the different services and subsystems of the access point (FIG. 4) direct the directable antenna and transmit a message intended for a client. Message sequence chart 700 shows the steps executed by each of the subsystems over a time interval represented by dash lines 702.

Message sequence chart 700 begins when media access control/CPU 704 receives a message to be sent to a client. At 714, transmitting begins with the media access control/CPU 700 for passing the message to transmission service 706. At 716, transmission service 706 consults the association table and the sets directable antenna 708 to the sector previously determined to be best suited for the client to whom the message is directed. With the directable antenna directed to the appropriate sector, transmission service 706 passes the packet to the baseband modem/transceiver 710 at 718. Baseband modem/transceiver 710 assembles the packet and transmits the packet at 720. Assuming the packet was received, at 722, an acknowledgment sent by the client is received at reception service 712. In sum, upon receiving a message directed to a particular client, the access point identifies the appropriate directional space to which the antenna should be directed, directs the antenna to that direction, and then assembles and transmits the packet to the client.

Figure 7B:
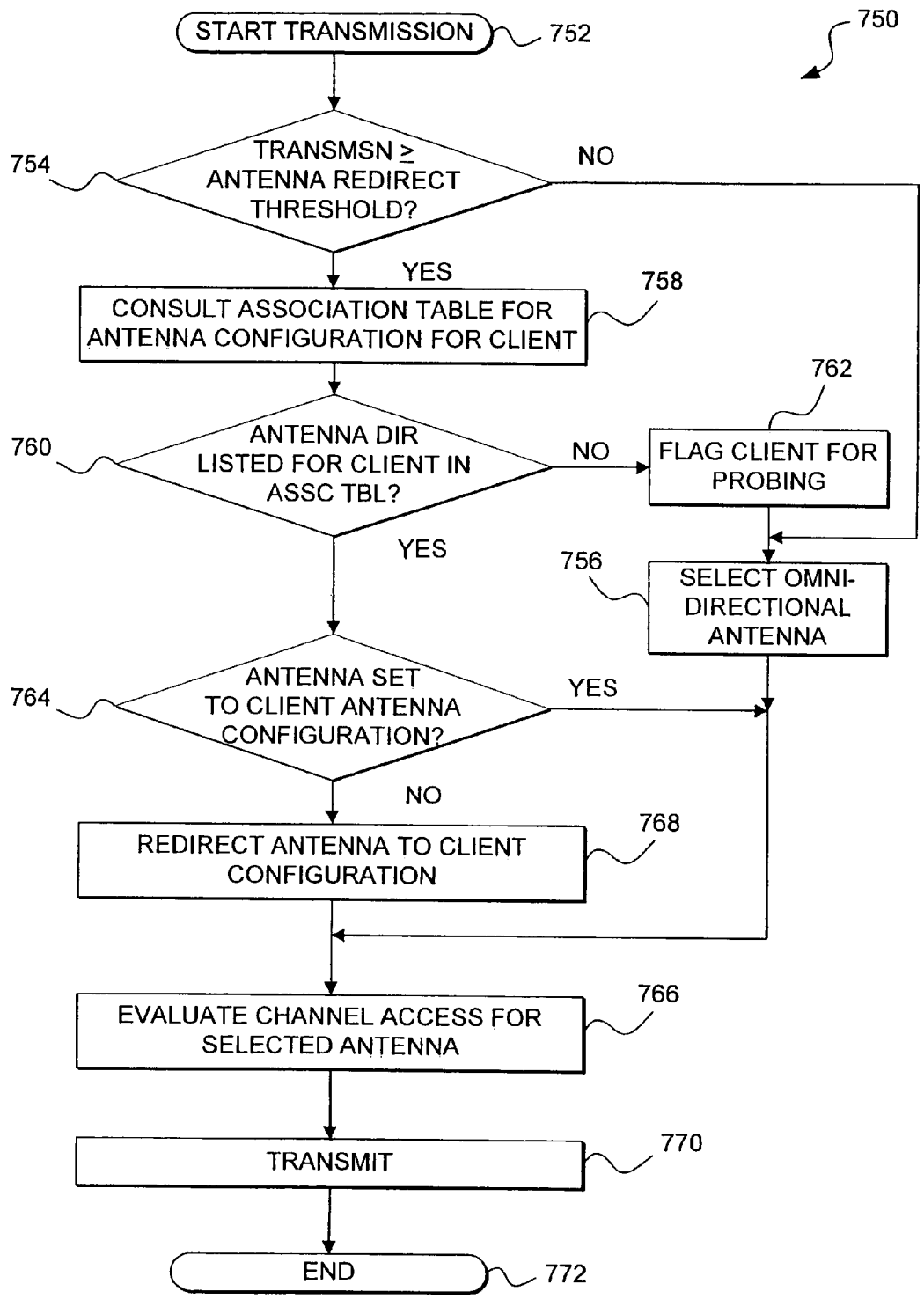
FIG. 7B is a flow diagram illustrating the logical steps for an access point to transmit a packet to a client.

A flow diagram 750 of FIG. 7B illustrates the logical steps undertaken by the access point in deciding if a message warrants using the directable antenna, as well as whether the channel is ready for the message to be sent. Flow diagram 750 begins at a step 752 with the receipt of a transmission for client. At a decision step 754, it is determined if the transmission is of sufficient size to warrant redirecting the antenna by determining if the characteristics of the message match or exceed a redirection threshold. Generally speaking, to warrant even the potentially minor overhead associated with redirecting the antenna, the message should meet or exceed a certain size, as shown in decision step 754. On the other hand, other criteria could be used to determine if the directable antenna should be appropriately directed and used for sending the packet. For example, certain types of messages or certain clients may be assigned priority such that the directable antenna will always be used for those messages or clients, respectively. For purposes of the example of flow diagram 750, however, only transmission size is used as the criterion for determining whether the directable antenna will be used.

If it is determined at decision step 754 that the transmission does not meet the redirection threshold, at a step 756, the omnidirectional antenna is selected for transmission of the message. As described above, the omnidirectional antenna is selected by using the diversity switch included in the radio/transceiver subsystem of the access point. On the other hand, if it is determined that the transmission does meet or exceed the redirection threshold, at a step 758, the association table in the access point is consulted to determine the directable antenna configuration for the client. It is assumed that the antenna configuration for the client will include a preferred directional space or sector. It is possible, however, that a preferred antenna configuration may specify use of the omnidirectional antenna. In any case, once the association table has been consulted at step 758, at a decision step 760, it is determined if, in the entry for the client in the association table, a preferred antenna direction or sector is included. If not, at a step 762 the client is flagged to trigger polling to probe a desired antenna direction for the client. The suitable antenna direction for the client may be determined using a process such as that described in flow diagram 600 of FIG. 6A. Once the client is flagged for antenna polling at step 762, the omnidirectional antenna is selected for transmission at step 756.

On the other hand, if it is determined at decision step 760 that there is a preferred antenna direction listed in the association table for the client, at a decision step 764, it is determined if the antenna is already set to the preferred client configuration stored in the association table. As will be appreciated, it is possible or even likely that the access point and the client will exchange communication with each other in a series communications. As a result, it is possible that the directable antenna may already be set to the preferred client configuration, and the antenna will not have to be redirected at all. If it is determined at decision step 764 that the antenna is not already directed to the preferred antenna direction, at step 766, the antenna is directed to the preferred antenna direction. Once the antenna is redirected, or if the antenna was determined at decision step 764 already to be directed to the preferred antenna direction for the client, at step 768, it is determined if clear channel access is available. In one embodiment of the present invention, 802.11 channel access procedures are performed for the selected antenna, whether the selected antenna is the omnidirectional antenna or the directable antenna. Once it is determined that the channel is clear, at step 770, the message is transmitted to the client. Flow diagram 750 ends at a step 774.

In addition to the logical steps illustrated in flow diagram 750, measures can be employed to eliminate potential transmission interference caused by a hidden client. For example, if the access point is about to transmit to a selected client using the directable antenna, the directable antenna may be steered to a direction resulting in communications that are not detectable by an additional client. Because the additional client may be unable to detect the ongoing communication, it may transmit a message to the access point and cause interference disrupting the ongoing communication with the selected client. To avoid this possibility, before beginning the transmission to the selected client, before transmitting to the known client, the access point transmits on the omnidirectional antenna protection mechanisms such as a self-directed clear to send frame. The omnidirectionally transmitted protection frames will be received by all clients within range of the omnidirectional antenna, and convey the intended transmission time of the access point. The additional client will honor the protection frames, and will not transmit and disrupt the communication with the selected client.

Access Point Reception Sequence

Figure 8A:
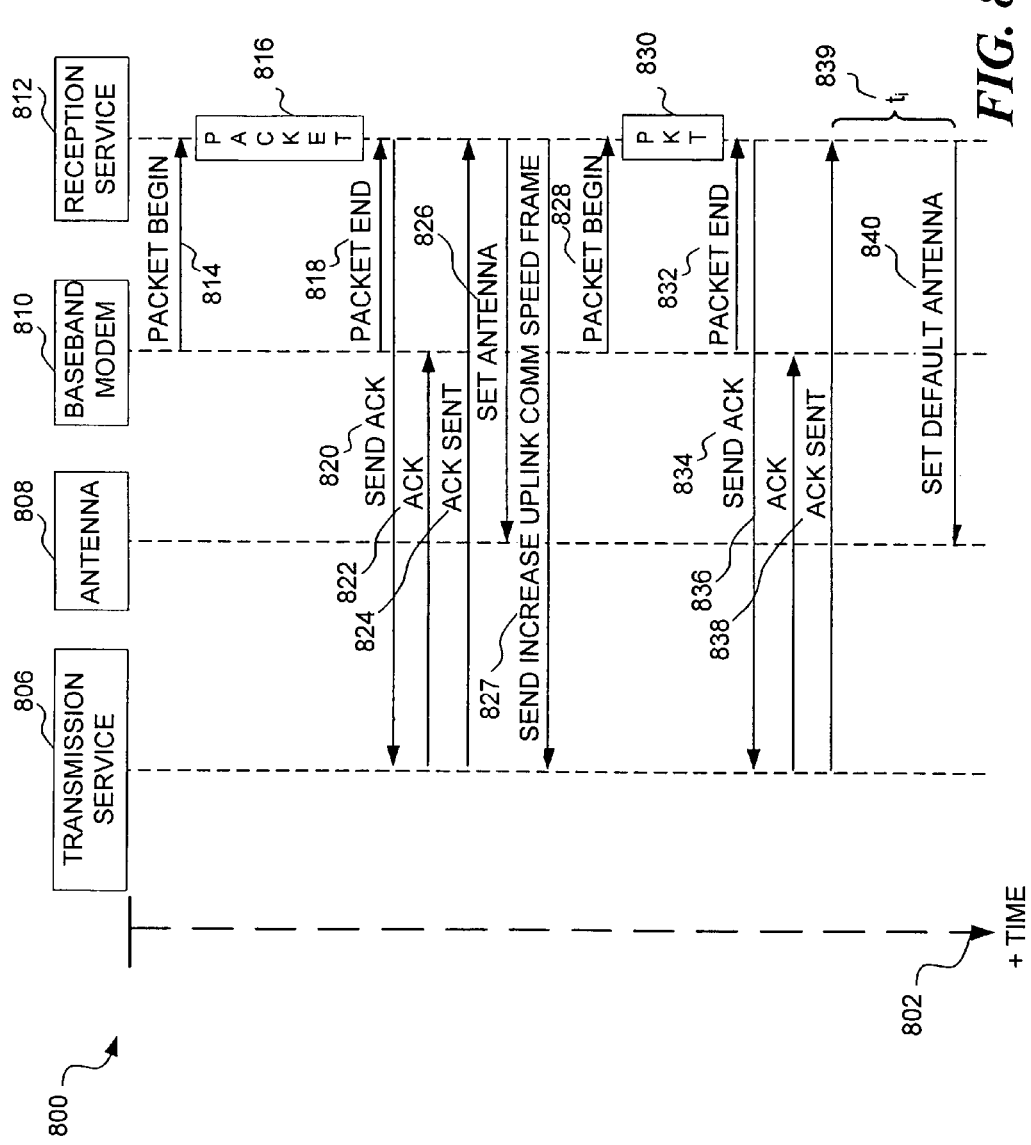
FIG. 8A is a message sequence chart illustrating a sequence of steps used by an access point to receive messages.

FIG. 8A illustrates a message sequence chart 800 representing how an access point according to an embodiment of the present invention processes a reception from a client and aligns the directable antenna to the optimal location for that client. More particularly, message sequence chart 800 shows how the different services and subsystems of the access point (FIG. 4) direct the directable antenna and receive a message from a client. As in the case of message sequence chart 700, message sequence chart 800 shows the steps executed by each of the subsystems over a time interval represented by a dash line 802.

Message sequence chart 800 begins when a baseband modem/transceiver 810 detects the beginning of a packet being received via the omnidirectional antenna at 814. Baseband modem/transceiver 810 passes the packet to a reception service 812. Reception service 812 receives a packet 816 until an end of the packet 818 is detected. After end of the packet 818 is detected, reception service directs a transmission service 806 to send an acknowledgment at 820. Transmission service 806 then directs baseband modem/transceiver 810 to transmit the acknowledgement at 822, and transmission service 806 indicates to reception service 812 that the acknowledgement has been sent at 824.

With uplink traffic being received from a client, reception service 812 then directs antenna 808 to the preferred antenna setting associated with the client sending the uplink traffic as noted in the access point association table at 826. Once the designated antenna has been selected and, if the selected antenna is the directable antenna and the antenna direction has been set at 826, reception service 812 directs transmission service 806 to send a frame to the client indicating the client can increase its uplink communication rate at 827. As described above, wireless communication channel assessment algorithms can adjust transmission rate based on historical information concerning packet retry rates, packet error rates, and RSSI. Accordingly, it may take some time to establish a successful communication history before the client will increase the communication rate of its own accord. An embodiment of the present invention preferably is configured to transmit an increase uplink communication rate frame to enable the communication rate to be increased immediately based on the channel throughput permitted by the antenna direction sent at 826. Accordingly, if packet 830 contains approximately the same quantity of data as packet 816, packet 830 can be received from the client in much less time 802 than was required to receive packet 816. Thus, the increase uplink communication rate frame provides further efficiency in enabling the network to immediately take advantage of uplink communication improvements made possible by the directable antenna.

When the end of the packet is detected at 832, reception service 812 once again directs transmission service 806 to send an acknowledgment to the client. At 836, transmission service 806 directs baseband modem/transceiver 810 to send an acknowledgement frame to the client. Transmission service 806 then communicates to reception service 812 that the acknowledgment has been sent at 838.

The access point will also cause the directable antenna to be appropriately redirected. For example, if a transmission from another client having a different antenna setting is detected, or after communication with the client previously using the link has ceased for a pre-determined interval of time $t_i$ 839, reception service 812 directs antenna 808 to revert to a default antenna direction at 840. The default antenna direction for the directable antenna may be set for the client that is most likely to next generate a high volume of uplink traffic, according to a manual client priority ranking, or according to other considerations.

Figure 8B:
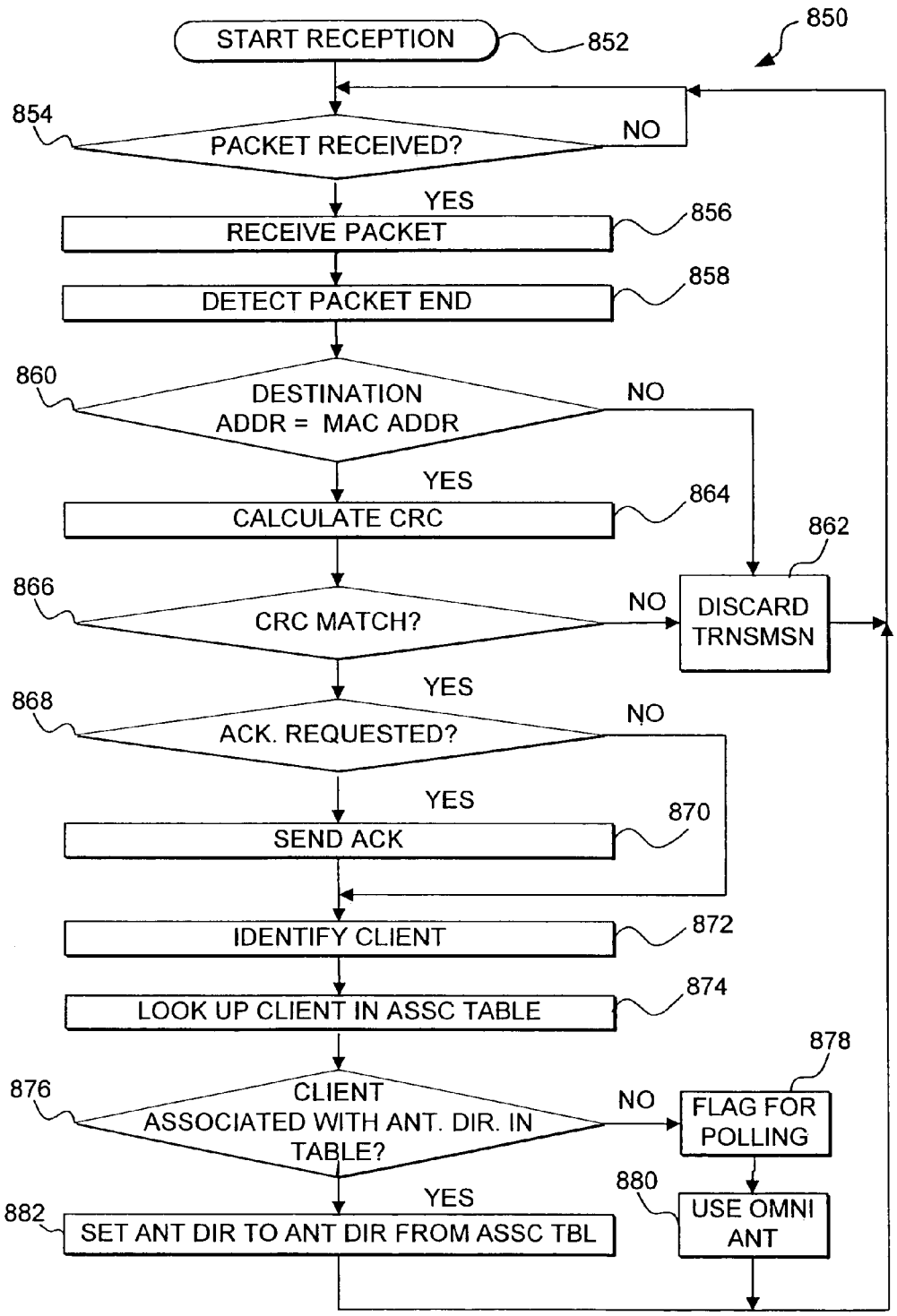
FIG. 8B is a flow diagram illustrating the logical steps for an access point to receive a packet from a client according to an embodiment of the present invention.

A flow diagram 850 of FIG. 8B illustrates the logical steps undertaken by the access point in receiving messages. Flow diagram 850 begins at a step 852. At a decision step 854, it is determined if a packet has been received from a client. If not, flow diagram 850 loops to decision step 854, idling until a packet is received. Once it is determined at a decision step 854 that a packet has been received from a client, at a step 856, the packet is received, and at a step 858, the access point awaits the end of the packet.

Once the end of the packet has been detected at step 858, at a decision step 860, it is determined if the destination address for the packet for the packet indicates that the packet was directed to the MAC address of the access point. If not, at a step 862, the content of the transmission is discarded, and flow diagram 850 loops to decision step 854 to await reception of the next packet.

On the other hand, if it is determined at decision step 860 that the destination address of the transmission indicates the transmission was directed to the MAC address of the access point, a cyclical redundancy check (CRC) value is calculated for the packet. If the CRC does not match the CRC transmitted in the packet, there has been in error in the transmission of the packet, and the packet is discarded at a step 862. On the other hand, if a decision step 866 indicates a match for the CRC, at a decision step 868, it is determined if an acknowledgment for the packet was requested by the sender. If so, at a step 870, an acknowledgment is sent.

Once the acknowledgment is sent at step 870, or if it was determined at decision step 868 that no acknowledgement was requested, at a step 872, the client transmitting the packet is identified. At a step 874, the client is looked up in the association table for the access point. At a decision step 876, it is determined if the client is associated with an antenna direction in the association table. If not, at a step 878, the client is flagged to be pulled for the identification of a preferred antenna direction, and at a step 880, the omnidirectional antenna is selected for use in receiving transmissions from the client at least temporarily. On the other hand, if it is determined at decision step 876 that the association table contains a preferred antenna direction for the client, at a step 882, the antenna direction in the association table is used to set the antenna to receive for the communication from the client. Once the antenna is set at step 880 or step 882, flow diagram 850 loops to decision step 854 to await receipt of the next packet.

In addition to the logical steps illustrated in flow diagram 850, measures can be employed to eliminate potential transmission interference caused by a hidden client. For example, if the access point is about to receive a communication from a selected client using the directable antenna, the directable antenna may be steered to a direction resulting in communications that are not detectable by an additional client. To avoid this possibility, to initiate the communication from the selected client, the access point transmits the clear to send frame to the selected client using the omnidirectional antenna. The omnidirectionally transmitted clear to send frame will be received by all clients within range of the omnidirectional antenna, and convey transmission access to the access point. The additional client will honor the clear to send frame, and will not transmit and disrupt the communication with the selected client. In addition to the logical steps illustrated in flow diagram 850, as previously described in connection with flow diagram 750 (FIG. 7B), measures can be employed to eliminate potential transmission interference caused by a hidden client.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for controlling communication between an access point and a client in a wireless network, comprising the steps of:
   (a) providing an omnidirectional antenna that is used for wireless communications with clients disposed around the omnidirectional antenna, in a network space;
   (b) providing a directable antenna that is selectively controlled to provide coverage of any of a plurality of different directional spaces, each of the directional spaces overlapping a portion of the network space;
   (c) identifying a client directional space from among the plurality of different directional spaces, the client directional space facilitating a higher communication rate between the access point and the client than a basic communication rate available between the access point and the client using the omnidirectional antenna;

(d) selecting one of the omnidirectional antenna and the directable antenna for communicating with the client based on at least one of:
  (i) a characteristic of a transmission communicated between the access point and client; and
  (ii) a characteristic of the wireless network; and
(e) when the directable antenna is selected, selectively directing the directable antenna to the client directional space.

2. The method of claim 1, further comprising the step of identifying an optimal directional space from among the plurality of directional spaces, the optimal directional space facilitating a highest communication rate between the access point and the client among the plurality of directional spaces.

3. The method of claim 2, wherein the step of identifying the optimal client directional space comprises the step of directing the directable antenna to at least a subset of the plurality of directions; and at least one of the steps of:
  (a) comparing one of a signal strength and a signal to noise ratio of a plurality of communications received from the client and selecting as the client directional space a directional space for which one of the signal strength and the signal to noise ratio is the greatest;
  (b) comparing one of a client signal strength and a client signal to noise ratio measured by the client for at least one polling communication received from the access point while the directable antenna was directed to an identifiable directional space determinable from a label appended to the polling communication; and
  (c) comparing a communication success rate for a plurality of communications exchanged with the client and selecting as the client directional space a direction space for which the communication success is highest.

4. The method of claim 3, wherein the communication success rate is determinable from at least one of:
  (a) a packet error rate;
  (b) a number of acknowledgement failures; and
  (c) a number of transmissions that are resent before a transmission is successfully received.

5. The method of claim 3, further comprising the step of transmitting a plurality of polling signals from the access point to the client, receipt of each of the polling signals causing the client to transmit a responsive communication for the access point to evaluate.

6. The method of claim 1, wherein upon directing the directable antenna to the client directional space, further comprising the step of causing the communication rate to be increased between the client and the access point, by at least one of:
  (a) increasing a data downlink transmission rate when transmitting data from the access point to the client; and
  (b) sending an increase transmission rate message from the access point to the client commanding the client to increase an uplink transmission rate when the client is transmitting data to the access point.

7. The method of claim 1, further comprising maintaining an association table at the access point, the association table including an entry for the client indicating at least one of:
  (a) a preferred omnidirectional communication rate to be used when the omnidirectional antenna is selected for communicating with the client; and
  (b) a preferred directional communication rate to be used when the directable antenna is selected and directed to the client directional space designated for the client.

8. The method of claim 1, wherein a characteristic of a transmission communicated between the access point and the client includes at least one of:
  (a) a volume of data in the transmission; and
  (b) a priority associated with the transmission.

9. The method of claim 1, wherein the characteristic of the wireless network includes at least one of:
  (a) a rate at which data communications are exchanged between the access point and the client;
  (b) a likelihood of a large volume of data being exchanged with the client based on a record of past communications with the client;
  (c) a reduced demand among other clients to communicate with the access point;
  (d) a reduced demand among other clients to exchange large volumes of data with the access point; and
  (e) a client priority assigned to the client.

10. The method of claim 1, wherein transmissions intended for all clients within the communication area are broadcast using the omnidirectional antenna.

11. The method of claim 1, further comprising the step of preventing a first client not in direct communication range with a second client from transmitting while the access point is communicating with the second client including one of:
  (a) before transmitting to the second client, transmitting on the omnidirectional antenna at least one protection mechanism frame adapted to prevent the first client from transmitting while communicating with the second client; and
  (b) upon receiving a request to send (RTS) frame from the second client, transmitting on the omnidirectional antenna a clear to send (CTS) frame to the second client.

12. A method for controlling communication between an access point and a client in a wireless network, comprising the steps of:
  (a) providing an omnidirectional antenna that is used for wireless communications with clients disposed around the omnidirectional antenna, in a network space;
  (b) providing a directable antenna that is selectively controlled to provide coverage of any of a plurality of different directional spaces, each of the directional spaces overlapping a portion of the network space;
  (c) identifying an optimal client directional space from among the plurality of different directional spaces, the optimal directional space facilitating a highest communication rate between the access point and the client among the plurality of directional spaces;
  (d) identifying a preferred directional communication rate for use when the directable antenna is directed to the optimal directional client space;
  (e) selecting one of the omnidirectional antenna and the directable antenna for communicating with the client; and
  (f) when the directable antenna is selected:
    (i) directing the directable antenna to the optimal client directional space; and
    (ii) communicating with the client using the preferred directional communication rate.

13. The method of claim 12, wherein the step of identifying the optimal client directional space includes the steps of directing the directable antenna to at least a subset of the plurality of different directional spaces; and at least one of the steps of:
- (a) comparing one of a signal strength and a signal to noise ratio of a plurality of communications received from the client and selecting as the optimal client directional space a directional space for which one of the signal strength and the signal to noise ratio is the greatest;
- (b) comparing one of a client signal strength and a client signal to noise ratio measured by the client for at least one polling communication received from the access point while the directable antenna was directed to an identifiable directional space determinable from a label appended to the polling communication; and
- (c) comparing a communication success rate for a plurality of communications exchanged with the client and selecting as the optimal client directional space a direction for which the communication success rate is highest.

14. The method of claim 13, further comprising the step of transmitting a plurality of polling signals from the access point to the client, receipt of each of the polling signals causing the client to transmit a responsive communication for the access point to evaluate.

15. The method of claim 12, further comprising the step, upon directing the directable antenna to the optimal client directional space, causing the communication rate to be increased between the client and the access point, by at least one of:
- (a) increasing a data downlink transmission rate when transmitting data from the access point to the client; and
- (b) sending an increase transmission rate message signaling the client to increase an uplink transmission rate, when the client is transmitting data to the access point.

16. The method of claim 12, further comprising the step of maintaining an association table in the access point, the association table including an entry for the client including at least one of:
- (a) a preferred omnidirectional communication rate to be used when the omnidirectional antenna is selected for communicating with the client; and
- (b) the preferred directional communication rate to be used when the directable antenna is selected and directed to the optimal client directional space.

17. The method of claim 12, wherein the step of selecting one of the omnidirectional antenna and the directable antenna for communicating with the client includes the step of evaluating at least one of:
- (a) a volume of data for the transmission;
- (b) a priority associated with the transmission;
- (c) a rate with which data communications are exchanged between the access point and the client;
- (d) a likelihood of a large volume of data being exchanged with the client based on a record of past communications exchanged with the client;
- (e) a reduced demand among other clients to communicate with the access point;
- (f) a reduced demand among other clients to exchange large volumes of data with the access point;
- (g) a client priority assigned to the client; and
- (h) whether a transmission is intended for at least one other client at least potentially within the network space, in addition to the client.

18. The method of claim 12, further comprising the step of preventing a first client not in direct communication range with a second client from transmitting while the access point is communicating with the second client including one of:
- (a) before transmitting to the second client, transmitting on the omnidirectional antenna at least one protection mechanism frame adapted to prevent the first client from transmitting while communicating with the second client; and
- (b) upon receiving a request to send (RTS) frame from the second client, transmitting on the omnidirectional antenna a clear to send (CTS) frame to the second client.

19. A networking system for communicating with at least one client in a wireless network, comprising:
- (a) an antenna subsystem, including:
  - (i) an omnidirectional antenna configured to provide coverage of a network space around the omnidirectional antenna;
  - (ii) a directable antenna that is controllable to provide coverage of any of a plurality of different directional spaces, each of the directional spaces overlapping a portion of the network space; and
  - (iii) an antenna switch coupled to both the omnidirectional antenna and the directable antenna, the antenna switch being configured to select one of the omnidirectional antenna and the directable antenna for at least one of a downlink and an uplink communication;
- (d) a processor;
- (e) a communication interface in communication with a network, the antenna subsystem, and the processor; and
- (c) a memory in communication with the processor, the memory storing data and machine instructions that cause the processor to carry out a plurality of functions, including:
  - (i) identifying a client directional space from among the plurality of directional spaces, the client directional space facilitating a higher communication rate between the access point and the client than a basic communication rate that is available between the access point and the client using the omnidirectional antenna;
  - (ii) selecting one of the omnidirectional antenna and the directable antenna for communicating with the client based on at least one of:
    - (A) a characteristic of a transmission communicated between the access point and client; and
    - (B) a characteristic of the wireless network; and
  - (iii) when the directable antenna is selected, directing the directable antenna to the client directional space.

20. The networking system of claim 19, wherein the machine instructions further cause the processor to identifying an optimal directional space as the client directional space, from among the plurality of different directional spaces, the optimal directional space facilitating a highest communication rate between the access point and the client among the plurality of directional spaces.

* * * * *